United States Patent
Kedem et al.

(10) Patent No.: US 11,256,529 B2
(45) Date of Patent: *Feb. 22, 2022

(54) METHODS AND APPARATUS FOR PROVIDING HYPERVISOR LEVEL DATA SERVICES FOR SERVER VIRTUALIZATION

(75) Inventors: Ziv Kedem, Tel Aviv (IL); Chen Yehezkel Burshan, Tel Aviv (IL); Yair Kuszpet, Netanya (IL); Gil Levonai, Tel Aviv (IL)

(73) Assignee: ZERTO LTD., Herzilya (IL)

(*) Notice: Subject to any disclaimer, the term of this patent is extended or adjusted under 35 U.S.C. 154(b) by 1472 days.

This patent is subject to a terminal disclaimer.

(21) Appl. No.: 13/175,892

(22) Filed: Jul. 4, 2011

(65) Prior Publication Data

US 2011/0265085 A1 Oct. 27, 2011

Related U.S. Application Data

(63) Continuation-in-part of application No. 13/039,446, filed on Mar. 3, 2011.
(Continued)

(51) Int. Cl.
*G06F 9/455* (2018.01)
*G06F 3/06* (2006.01)
(Continued)

(52) U.S. Cl.
CPC .......... *G06F 9/45558* (2013.01); *G06F 3/067* (2013.01); *G06F 3/0653* (2013.01);
(Continued)

(58) Field of Classification Search
CPC ......... G06F 9/44558; G06F 2009/4557; G06F 2009/45579; G06F 3/0653; G06F 3/0665;
(Continued)

(56) References Cited

U.S. PATENT DOCUMENTS

| | | |
|---|---|---|
| 4,862,411 A | 8/1989 | Dishon et al. |
| 5,212,784 A | 5/1993 | Sparks |

(Continued)

FOREIGN PATENT DOCUMENTS

WO 2009151445 A1 12/2009

OTHER PUBLICATIONS

Olzak, T., "Secure hypervisor-based vitual server environments", Feb. 26, 2007. http://www.techrepublic.com/blog/security/secure-hypervisor-based-virtual-server-environments/160.

(Continued)

*Primary Examiner* — Farley Abad
(74) *Attorney, Agent, or Firm* — Foley & Lardner LLP

(57) ABSTRACT

A cross-host multi-hypervisor system, including a plurality of host sites, each site including at least one hypervisor, each of which includes at least one virtual server, at least one virtual disk that is read from and written to by the at least one virtual server, a tapping driver in communication with the at least one virtual server, which intercepts write requests made by any one of the at least one virtual server to any one of the at least one virtual disk, and a virtual data services appliance, in communication with the tapping driver, which receives the intercepted write requests from the tapping driver, and which provides data services based thereon, and a data services manager for coordinating the virtual data services appliances at the site, and a network for communicatively coupling the plurality of sites, wherein the data services managers coordinate data transfer across the plurality of sites via the network.

19 Claims, 7 Drawing Sheets

Related U.S. Application Data

(60) Provisional application No. 61/314,589, filed on Mar. 17, 2010.

(51) Int. Cl.
   *G06F 11/14* (2006.01)
   *G06F 11/20* (2006.01)

(52) U.S. Cl.
   CPC ........ *G06F 3/0665* (2013.01); *G06F 11/1451* (2013.01); *G06F 11/1471* (2013.01); *G06F 11/1484* (2013.01); *G06F 11/2069* (2013.01); *G06F 2009/4557* (2013.01); *G06F 2009/45579* (2013.01); *G06F 2201/815* (2013.01); *G06F 2201/84* (2013.01)

(58) Field of Classification Search
   CPC .. G06F 3/067; G06F 11/1451; G06F 11/1471; G06F 11/1484; G06F 9/455; G06F 9/45541; G06F 9/45558; G06F 9/4856; G06F 9/45533; G06F 11/2069; G06F 2201/815; G06F 2201/84
   USPC .......................................................... 718/1
   See application file for complete search history.

(56) References Cited

U.S. PATENT DOCUMENTS

| | | | |
|---|---|---|---|
| 5,544,347 A | 8/1996 | Yanai et al. | |
| 5,649,152 A | 7/1997 | Ohran et al. | |
| 5,664,186 A | 9/1997 | Bennett et al. | |
| 5,835,953 A | 11/1998 | Ohran | |
| 5,933,653 A | 8/1999 | Ofek | |
| 5,935,260 A | 8/1999 | Ofer | |
| 5,991,813 A | 11/1999 | Zarrow | |
| 6,073,209 A | 6/2000 | Bergsten | |
| 6,073,222 A | 6/2000 | Ohran | |
| 6,658,591 B1 | 12/2003 | Arndt | |
| 6,910,160 B2 | 6/2005 | Bajoria et al. | |
| 6,944,847 B2 | 9/2005 | Desai et al. | |
| 7,063,395 B2 | 6/2006 | Gagne et al. | |
| 7,143,307 B1 | 11/2006 | Witte et al. | |
| 7,325,159 B2 | 1/2008 | Stager et al. | |
| 7,421,617 B2 | 9/2008 | Anderson et al. | |
| 7,464,126 B2 | 12/2008 | Chen | |
| 7,475,207 B2 | 1/2009 | Bromling et al. | |
| 7,516,287 B2 | 4/2009 | Ahal et al. | |
| 7,523,277 B1 | 4/2009 | Kekre et al. | |
| 7,557,867 B2 | 7/2009 | Goo | |
| 7,577,817 B2 | 8/2009 | Karpoff et al. | |
| 7,577,867 B2 | 8/2009 | Lewin et al. | |
| 7,603,395 B1 | 10/2009 | Bingham et al. | |
| 7,647,460 B1 | 1/2010 | Wilson et al. | |
| 7,720,817 B2 | 5/2010 | Stager et al. | |
| 7,765,433 B1 | 7/2010 | Krishnamurthy | |
| 7,791,091 B2 | 9/2010 | Nagai | |
| 7,849,361 B2 | 12/2010 | Ahal et al. | |
| 7,853,764 B2 | 12/2010 | Bitner et al. | |
| 7,865,893 B1* | 1/2011 | Omelyanchuk et al. | 718/1 |
| 7,971,091 B1 | 6/2011 | Bingham et al. | |
| 8,020,037 B1 | 9/2011 | Schwartz et al. | |
| 8,156,301 B1 | 4/2012 | Khandelwal et al. | |
| 8,296,419 B1 | 10/2012 | Khanna et al. | |
| 8,353,031 B1* | 1/2013 | Rajan et al. | 726/22 |
| 8,650,299 B1 | 2/2014 | Huang et al. | |
| 2003/0149910 A1 | 8/2003 | Qin et al. | |
| 2004/0068561 A1 | 4/2004 | Yamamoto et al. | |
| 2004/0153639 A1 | 8/2004 | Cherian et al. | |
| 2005/0071588 A1 | 3/2005 | Spear et al. | |
| 2005/0171979 A1 | 8/2005 | Stager et al. | |
| 2005/0182953 A1 | 8/2005 | Stager et al. | |
| 2005/0188256 A1 | 8/2005 | Stager et al. | |
| 2006/0047996 A1 | 3/2006 | Anderson et al. | |
| 2006/0048002 A1 | 3/2006 | Kodi et al. | |
| 2006/0112222 A1 | 5/2006 | Barrall | |
| 2006/0129562 A1 | 6/2006 | Pulamarasetti et al. | |
| 2006/0130154 A1 | 6/2006 | Lam et al. | |
| 2006/0136685 A1 | 6/2006 | Griv et al. | |
| 2006/0161394 A1* | 7/2006 | Dulberg et al. | 702/184 |
| 2007/0028244 A1 | 2/2007 | Landis et al. | |
| 2007/0112772 A1 | 5/2007 | Morgan et al. | |
| 2007/0162513 A1 | 7/2007 | Lewin et al. | |
| 2007/0220311 A1* | 9/2007 | Lewin et al. | 714/6 |
| 2007/0266433 A1 | 11/2007 | Moore | |
| 2008/0086726 A1 | 4/2008 | Griffith et al. | |
| 2008/0177963 A1 | 7/2008 | Rogers | |
| 2008/0195624 A1 | 8/2008 | Ponnappan et al. | |
| 2008/0208555 A1 | 8/2008 | Tatsuoka et al. | |
| 2009/0150510 A1 | 6/2009 | Kovacs et al. | |
| 2009/0187776 A1* | 7/2009 | Baba et al. | 713/320 |
| 2009/0249330 A1 | 10/2009 | Abercrombie et al. | |
| 2009/0283851 A1 | 11/2009 | Chen | |
| 2009/0307396 A1 | 12/2009 | Nogueras et al. | |
| 2010/0017801 A1* | 1/2010 | Kundapur | 718/1 |
| 2010/0027552 A1 | 2/2010 | Hill | |
| 2010/0058335 A1 | 3/2010 | Weber | |
| 2010/0115332 A1 | 5/2010 | Zheng et al. | |
| 2010/0150341 A1 | 6/2010 | Dodgson et al. | |
| 2010/0175064 A1 | 7/2010 | Brahmaroutu | |
| 2010/0198949 A1 | 8/2010 | Elrom et al. | |
| 2010/0198972 A1 | 8/2010 | Umbehocker | |
| 2010/0250824 A1* | 9/2010 | Belay | 711/6 |
| 2010/0250892 A1 | 9/2010 | Logan et al. | |
| 2010/0274886 A1 | 10/2010 | Nahum et al. | |
| 2010/0274890 A1 | 10/2010 | Patel | |
| 2011/0022812 A1 | 1/2011 | van der Linden et al. | |
| 2011/0075674 A1 | 3/2011 | Li et al. | |
| 2011/0087874 A1 | 4/2011 | Timashev et al. | |
| 2011/0099200 A1 | 4/2011 | Blount et al. | |
| 2011/0099342 A1 | 4/2011 | Ozdemir | |
| 2011/0107331 A1 | 5/2011 | Evans et al. | |
| 2011/0125980 A1 | 5/2011 | Brunet et al. | |
| 2011/0131183 A1 | 6/2011 | Chandhok et al. | |
| 2011/0153569 A1 | 6/2011 | Fachan et al. | |
| 2011/0161299 A1 | 6/2011 | Prahlad et al. | |
| 2011/0161301 A1 | 6/2011 | Pratt et al. | |
| 2011/0179341 A1 | 7/2011 | Falls et al. | |
| 2011/0202734 A1 | 8/2011 | Dhakras et al. | |
| 2011/0264786 A1* | 10/2011 | Kedem et al. | 709/223 |
| 2012/0110086 A1 | 5/2012 | Baitinger et al. | |
| 2013/0014104 A1* | 1/2013 | Natanzon et al. | 718/1 |
| 2014/0331221 A1 | 11/2014 | Dong et al. | |

OTHER PUBLICATIONS

Notification Concerning Transmittal of International Preliminary Report on Patentability dated Jan. 7, 2014 in corresponding PCT Application No. PCT/IL2012/000271, 12 pages.

U.S. Final Office Action dated Dec. 30, 2013 in related U.S. Appl. No. 13/039,446, filed Mar. 3, 2011, 10 pages.

U.S. Office Action dated Apr. 26, 2013 in related U.S. Appl. No. 13/367,448, filed Feb. 7, 2012, 19 pages.

U.S. Office Action dated Jun. 6, 2013 in related U.S. Appl. No. 13/039,446, filed Mar. 3, 2011, 15 pages.

U.S. Office Action dated Mar. 4, 2013 in related U.S. Appl. No. 13/039,446, filed Mar. 3, 2011, 13 pages.

Illuminata EMC RecoverPoint: Beyond Basics CDP Searched via internet on Nov. 10, 2013.

Mendocino: The RecoveryOne Solution, Architecture Guide, 22 pages Product Version 1.0, Jan. 3, 2006.

NetWorker PowerSnap Module for EMC Symmetrix, Release 2.1 Installation and Administrators Guide, 238 pgs, printed Sep. 2005.

U.S. Final Office Action dated Feb. 13, 2014 in related U.S. Appl. No. 13/367,448, filed Feb. 7, 2012.

Amendment "B" and Response to Office Action from Prosecution History of U.S. Pat. No. 7,603,395, dated Apr. 9, 2009, (13 pages).

Amendment "E" and Response to Office Action from Prosecution History of U.S. Pat. No. 7,971,091., dated Nov. 19, 2010, (14 pages).

(56) References Cited

OTHER PUBLICATIONS

Amendment and Response to Office Action from Prosecution History of U.S. Pat. No. 7,647,460, dated Aug. 30, 1999 (22 pages).
Answer Claim Construction Brief of Plaintiffs EMC Corporation and EMC Israel Development Center, Ltd., *EMC Corporation and EMC Israel Development Center, Ltd.*, v. *Zerto, Inc.*, Case No. 12-956(GMS), May 9, 2014, (24 pages).
Appellants' Brief Pursuant to 37 C.F.R section 1.192 from Prosecution History of U.S. Pat. No. 7,647,460., May 9, 2002, (34 pages).
Complaint, *EMC Corporation and EMC Israel Development Center, Ltd.*, v. *Zerto, Inc.*, Case No. Demand for Jury Trial, Jul. 20, 2012, (13 pages).
Defendant Zerto, Inc.'s Amended Answer to the First Amended Complaint, Affirmative Defense, and Counterclaims, *EMC Corporation and EMC Israel Development Center, Ltd.*, v. *Zerto, Inc.*, Case No. 12-956-GMS, Aug. 7, 2014, (34 pages).
Defendant Zerto, Inc.'s Claim Construction Answering Brief, *EMC Corporation and EMC Israel Development Center, Ltd.*, v. *Zerto, Inc.*, Case No. 12-956 (GMS), May 9, 2014, (23 pages).
Defendant Zerto, Inc.'s Opening Brief in Support of its Motion for Leave to Amend its Answer to the First Amended Complaint, Affirmative Defense and Counterclaims, *EMC Corporation and EMC Israel Development Center, Ltd.*, v. *Zerto, Inc.*, Case No. 12-956-GMS, Jun. 6, 2014, (24 pages).
Defendant Zerto, Inc.'s Opening Brief in Support of Its Motion for Leave to Amend Its Answer to the First Amended Complaint, Affirmative Defense and Counterclaims, *EMC Corporation and EMC Israel Development Center, Ltd.*, v. *Zerto, Inc.*, Case No. 12-956(GMS) 24 pages, Jun. 6, 2014.
Defendant Zerto, Inc.'s Opening Claim Construction Brief., *EMC Corporation and EMC Israel Development Center, Ltd.*, v. *Zerto, Inc.*, Case No. 12-956(GMS), Apr. 11, 2014, (26 pages).
Defendant Zerto, Inc.'s Reply Brief in Support of its Motion for Leave to Amend its Answer to the First Amended Compliant, Affirmative Defense and Counterclaims, *EMC Corporation and EMC Israel Development Center, Ltd.*, v. *Zerto, Inc.*, Case No. 12-956-GMS, Jul. 9, 2014, (16 pages).
Defendant's Answering Brief in Opposition to Plaintiffs' Motion to Strike and Dismiss Defendant's Affirmative Defense and Counterclaims of "Invalidity" based on Assignor Estoppel, *EMC Corporation and EMC Israel Development Center, Ltd.*, v. *Zerto, Inc.*, Case No. 12-956(GMS), Nov. 5, 2012, (21 pages).
EMC Corporation and EMC Israel Development Center, Ltd.'s Answer to the Amended Counterclaims of Zerto Inc., *EMC Corporation and EMC Israel Development Center, Ltd.*, v. *Zerto, Inc.*, Case No. 12-956-GMS, Aug. 25, 2014, (12 pages).
EMC's Answer Brief in Opposition to Zerto's Motion for Judgment on the Pleadings on Count III o fthe First Amended Complaint, *EMC Corporation and EMC Israel Development Center, Ltd.*, v. *Zerto, Inc.*, Case No. 12-956-GMS, Aug. 11, 2014, (25 pages).
EMC's Answering Brief in Opposition to Zerto's Motion for Leave to Amend its Answer to the First Amended Complaint by Adding an Inequitable Conduct Defense and Counterclaims, *EMC Corporation and EMC Israel Development Center, Ltd.*, v. *Zerto, Inc.*, Case No. 12-956-GMS, Jun. 23, 2014 (25 pages).
Joint Appendix of Intrinsic and Dictionary Evidence, *EMC Corporation and EMC Israel Development Center, Ltd.*, v. *Zerto, Inc.*, Case No. 12-956-GMS, May 12, 2014, (366 pages).
Joint Claim Construction Chart, *EMC Corporation and EMC Israel Development Center, Ltd.*, v. *Zerto, Inc.*, Case No. 12-956(GMS), Mar. 21, 2014, (24 pages).
Memorandum, *EMC Corporation and EMC Israel Development Center, Ltd.*, v. *Zerto, Inc.*, Case No. 12-956-GMS, Jul. 31, 2014 (8 pages).
Opening Brief in Support of Defendant Zerto, Inc.'s Motion for Judgment on the Pleadings on Count III of the First Amended Compliant, *EMC Corporation and EMC Israel Development Center, Ltd.*, v. *Zerto, Inc.*, Case No. 12-956-GMS, Jul. 25, 2014, (19 pages).

Order Construing the Terms of U.S. Pat. No. 7,647,460; U.S. Pat. No. 6,073,222; U.S. Pat. No. 7,603,395; U.S. Pat. No. 7,971,091; and U.S. Pat. No. 7,577,867, *EMC Corporation and EMC Israel Development Center, Ltd.*, v. *Zerto, Inc.*, Case No. 12-956-GMS, Sep. 5, 2014, (0 pages).
Plaintiffs EMC Corporation and EMC Israel Development Center, Ltd.'s Opening Claim Construction Brief, *EMC Corporation and EMC Israel Development Center, Ltd.*, v. *Zerto, Inc.*, Case No. 12-956(GMS), Apr. 11, 2014, (26 pages).
Plaintiffs' Opening Brief in Support of their Motion to Strike and Dismiss Defendant's Affirmative Defense and Counterclaims of "Invalidity" Based on Assignor Estoppel, *EMC Corporation and EMC Israel Development Center, Ltd.*, v. *Zerto, Inc.*, Case No. 12-956(GMS), Oct. 4, 2012, (18 pages).
Revised Joint Claim Construction Chart, *EMC Corporation and EMC Israel Development Center, Ltd.*, v. *Zerto, Inc.*, Case No. 12-956(GMS), Apr. 11, 2014, (19 pages).
Revised Joint Claim Construction Chart, *EMC Corporation and EMC Israel Development Center, Ltd.*, v. *Zerto, Inc.*, Case No. 12-956(GMS), Jun. 6, 2014, (19 pages).
Transcript of Markman Hearing, *EMC Corporation and EMC Israel Development Center, Ltd.*, v. *Zerto, Inc.*, Case No. 12-956-GMS, Jun. 25, 2014 (94 pgs).
FreezeFrame User's Guide, Version 1.1, Document Version 1.1, 60 pgs, Nov. 1993.
Harper Collins, Collins English Dictionary, Third Edition Updated 1994, Section JA-258-260 (3 pages).
Merriam-Webster, Inc., Webster's Third New International Dictionary, Section JA-276-279 (4 pages) Copyright 2002.
Microsoft Press, Microsoft Computer Dictionary, Fifth Edition, Section JA-341-343, p. 296 (4 pages) 2002.
Reference Model for Open Storage Systems Interconnection, Mass Storage System Reference Model Version 5, Sep. 1994 (36 pages).
Storage Networking Industry Association Dictionary, http://web.archive.org/web20060220153102/http://www.snia.org/education/dictionary/a, pp. JA-261-273 (13 pages) 2006.
Tech Target Search.,http://searchstorage.techtarget.com/definition/storage-snapshot.html, (p. JA-274) Jul. 2005.
The Kashya KB 4000 Administrator's User Guide Product Release 2.0, 105 pgs, Aug. 2004.
The RecoveryONE Solution, Architecture Guide, Product Version 1.0, 22 pgs, Jan. 2006.
US Office Action on U.S. Appl. No. 13/175,898 dated Jul. 17, 2014.
US Office Action on U.S. Appl. No. 13/367,448 dated Feb. 3, 2015.
US Office Action on U.S. Appl. No. 13/039,446 dated Jan. 2, 2015.
Warrick, et al, "IBM Total Storage Enterprise Storage Server Implementing ESS Copy Services in Open Environments", 642 pgs, IBM Jul. 2004.
Webster's New World Dictionary, Dictionary of Computer Terms, Sixth Edition, (4 pages).
US Office Action for U.S. Appl. No. 13/039,446 dated Jan. 2, 2015.
US Office Action for U.S. Appl. No. 13/175,898 dated Jul. 17, 2014.
Final Office Action for U.S. Appl. No. 13/175,898 dated Mar. 25, 2015.
"Zerto Hits Triple-Digit Growth Once Againl Builds Toward a Future of Uninterrupted Technology," Zerto, Feb. 3, 2015, 2 pages.
A Comparison of Hypervisor-based Replication vs. Current and Legacy BC/DR Technologies, 2012.
Choosing a VSS Provider Veeam Backup Guide for HyperV, Mar. 18, 2015.
Data Loss Avoidance: Near Continuous Data Protection and Streamlined Disaster Recovery, www.veeam.com.
Defendant Zerto, Inc's Motion for Judgment as a Matter of Law of No Willful Infringement of the '867 Patent . . . , Apr. 30, 2015.
Deploy Hyper-V Replica, published May 31, 2012.
Double-Take Availability for vSphere: Technical Data Sheet, 2014.
EMC Recoverpoint Family, 2012.
EMC Recoverpoint for Virtual Machines: Protects and Recovers VMs to Any Point in Time, 2012.
EMC's Answering Brief in Opposition of Zerto's Renewed Motion for Judgment as a Matter of Law or, in the Alternative, for a New Trial, Jul. 17, 2015.

(56) References Cited

OTHER PUBLICATIONS

EMC's Answering Brief in Opposition to Zerto's Motion for a New Trial and to Alter or Amend the Judgment, due to an Inconsistent Verdict, Jul. 17, 2015.
EMC's Opening Brief in Support of Its Motion for an Accounting and to Amend the Judgment, Jun. 24, 2015.
EMC's Opening Brief in Support of Its Renewed Motion for Judgment as a Matter of Law, Jun. 5, 2015.
HP 3PAR Remote Copy Software User Guide HP 3PAR OS 3.2.1 MU2, copyright 2009.
HP 3PAR Remote Copy Software, 2015, www.hp.com.
Hyper-V Replica Feature Overview, published Feb. 29, 2012.
Judgment, May 21, 2015.
Letter regarding EMC's Request to File Summary Judgment Motions—Redacted, dated Feb. 13, 2015, 120 pages.
Letter to Judge Sleet re. *EMC Corporation v. Zerto, Inc.*, Feb. 6, 2015.
Letter to Judge Sleet Regarding EMC's Request for Summary Judgment, Oct. 21, 2014, 120 pages.
Managing VM Data with Tintri, Phillips, John, 2013.
Metro Mirror and Global Mirror.
Plaintiff's Motion for Judgment As a Matter of Law Pursuant to Fed. R. Civ. P. 50(a), May 6, 2015.
Report on the Filing or Determination of an Action Regarding a Patent or Trademark, dated May 22, 2015.
Using Double-Take Software and the Virtual Recovery Appliance, http://www.discoposse.com/index.php/category/technology/.
VMware vCenter Site Recovery Manager5 with vSphere Replication, 2011.
VMware vSphere Replication 6.0, Apr. 2015.
vReplicator Version 3.0, 2009.
Zerto Announces General Availability of Zerto Virtual Replication Version 4.0, May 5, 2015.
Zerto Inc.'s Motion for Judgment as a Matter of Law, May 6, 2015.
Zerto Raises 26 Million in Series D Financing to Accelerate Hybrid Cloud Adoption, Jun. 18, 2014.
Zerto Virtual Replication Release Notes, 2015.
Zerto, Inc's Brief in Support of Its Motion for a New Trial, and to Alter or Amend the Judgment, Due to an Inconsistent Verdict, Jun. 19, 2015.
Zerto, Inc's Brief in Support of Its Renewed Motion for Judgment As a Matter of Law or, in the Alternative, for a New Trial, Jun. 19, 2015.
Zerto's Hypervisor-based Replication: A New Approach to Business/Continuity Disaster Recovery, 2012.
Zerto's Hypervisor-Based, Enterprise-Class Replication and Continuous Data Protection, 2012.
Zerto's Protect Applications, Not Just Data: BC/DR for Virtualized Applications, 2012.
Zerto's ZVR and Hyper-V, 2014.
Office Action on U.S. Appl. No. 13/175,898 dated Dec. 18, 2015.
U.S. Office Action dated Sep. 1, 2015.
U.S. Office Action dated Oct. 1, 2015.
U.S. Office Action dated Sep. 11, 2015.
U.S. Office Action on U.S. Appl. No. 14/687,341 dated Mar. 3, 2016.
Appellant Zerto, INC.'S Motion for Extension of Time to File its Initial Brief in the United States District Court for the District of Delaware in Case No. 1:12-cv-00956-GMS, May 4, 2016.
Appendix pages dated May 8, 2017.
Appendix pages dated May 9, 2017.
Corrected EMC Opening Brief dated Sep. 16, 2016.
Corrected Non-Confidential Brief for Cross-Appellants EMC Corporation and EMC Israel Development Center LTD, Appeals from the United States District Court for the District of Delaware in No. 1:12-cv-00956-GMS, Judge Gregory M. Sleet, Sep. 16, 2016.
Declaration of Allan Lipka before Patent Trial and Appeal Board, Patent Interference No. 106,070, Jun. 28, 2017.
Declaration of Christos Karamanolis, PH.D., Patent Interference, 106,070, Jun. 27, 2017.
Declaration of Ian Jestice, Patent Interference No. 106,070, Jul. 6, 2017.
Declaration of James Dowell before Patent Trial and Appeal Board, Patent Interference No. 106,070, Jun. 29, 2017.
Declaration of Jeremy Tigan In support of EMC's Renewed Motion for an Ongoing Royalty Rate Covering Post-Judgment Sales in United Stated District Court for Delaware case 1:12-cv-00956-GMS dated Jul. 22, 2016.
Declaration of John Blumenthal, Jul. 28, 2017.
Declaration of Matan Gilat before Patent Trial and Appeal Board, Patent Interference No. 106,070, Jun. 29, 2017.
Declaration of Matt Amdur before Patent Trial and Appeal Board, Patent Interference No. 106,070, Jun. 29, 2017.
Declaration of Oded Kedem in Support of Zerto's Opposition to EMC's Renewed Motion for an Ongoing Royalty Rate covering Post Judgement Sales in United States District Court for Delaware Case 1:12-cv-00956-GMS, Sep. 1, 2016.
Declaration of Thomas R.Galligan before Patent Trial and Appeal Board, Patent Interference No. 106,070, Jul. 6, 2017.
Declaration of Ziv Kedem in Support of Zerto's Opposition to EMC's Renewed Motion for an Ongoing Royalty Rate Covering Post Judgment Sales in the United States District Court for Delaware Case 1:12-cv-00956-GMS, Sep. 1, 2016.
Declaration-Bd.R. 203(b) USPTO Natanzon (U.S. Appl. No. 13/039,446) et al. v Kedem (U.S. Appl. No. 13/039,446), Jan. 17, 2017.
Defendant Zerto, INC.'s Notice of Appeal in the United States District Court for the District of Delaware, Case No. 12-956-GMS, September?, 2017.
Defendant Zerto, INC's. Notice Of Appeal in the United States District Court dated September?, 2017.
Defendant Zerto's Answering Brief in Opposition to Plaintiffs Motion Concerning an Ongoing Royalty Rate Covering Post Judgment Sales in United States District Court for Delaware Case 1:12-cv-00956-GMS dated Sep. 1, 2016.
Defendant Zerto's Notice Of Appeal, Case 1:12-cv-00956-GMS, September?, 2017.
Defendant Zerto's Objections to Plaintiffs Bill of Costs, Case 1:12-cv-00956-GMS, Aug. 21, 2017.
Email from Allan Lipka dated Apr. 4, 2006, RE: Ezra Tech DD Presentation.
Email from Allan Lipka dated Feb. 28, 2006, RE:Topio.
Email from Chen Burshan dated Aug. 17, 2006, Reversion 2.3 core documents.
Email from Christos Karamanlis dated Apr. 3, 2006, Ezra Feedback.
Email from Christos Karamanolis dated Mar. 9, 2006, Kashya scalability testing.
Email from Christos Karamanolis, Monday Jan. 30, 2016. FW:Disaster Recovery.
Email from Karthik Rau dated Mar. 15, 2006, RE: Updated Docs.
EMC's Motions to Supplement the Record on its Motion for Permanent Injunction dated Dec. 4, 2015.
EMC's Opening Brief in Supoprt of its Renewed Motion For an Ongoing Royalty Rate Covering Post Judgment Sales in United States District Court for Delaware case 1:12-cv-00956-GMS dated Jul. 22, 2016.
EMC's Reply Brief dated Jan. 11, 2017.
EMC's Reply Brief in Support of its Renewed Motion for an Ongoing Royalty Rate Covering PostJudgment Sales in the United States District Court for Delaware Case 1:12-cv-00956-GMS, Oct. 4, 2016.
EMC's Reply in Support Of Its Motion To Supplement The Record On Its Motion for A Permanent Injunction dated Jan. 4, 2016.
EMC's Response Letter regarding Ongoing Royalty Rates. Case 1:12-cv-00956-GMS, Aug. 9, 2017.
Ex. 2031, Word attachment to Jun. 21, 2006 email from J Blumenthal, Possible Configurations of a Kashya based ESX Dr Solution.
Ex.2025, email from Allan Lipka dated Apr. 6, 2008, Ezra Feedback.
Ex.2026, Email from Shlomo Ahal dated Jun. 4, 2006, summaries for Shlomo's trip.
Ex.2028, VMware summary- Boston meetings attached to Jun. 4, 2006 email from Sh.Ahal.

(56) References Cited

OTHER PUBLICATIONS

Ex.2029, Possible Configurations of a K-Based ESX DR Solution v.1, Apr. 14, 2006.
Ex.2032, Email from John Blumenthal dated Jun. 21, 2006, Integration Discussion Notes.
Ex.2033, Email from Ziv Kedem dated Aug. 15, 2006, VMware Kashya Summary.
Ex.2034, Word attachment to Aug. 15, 2006 email from Z Kedem.
Ex.2035 Email from Narasimha Raghunandana dated Aug. 15, 2006, Kashya binary that can be installed in a virtual machine.
Ex.2037, Email from Shlomo Ahal dated Sep. 13, 2006, FW:proj plan.
Exhibit 2038, Word attachment to Sep. 13, 2006 email from Shlomo Ahal, Disaster Recovery Project Plan.
Exhibit 2051. Federal Circuit Affirmance Judgement 1-12-cv-00956-GMS, Jun. 12, 2017.
Exhibit A "Trade in Trade Up" dated Dec. 21, 2015.
Exhibit A United States Patent and Trademark Office; *Hughes Networks Systems LLC* v *California Institute of Technology* dated Jan. 5, 2016.
Exhibit A Case 1:12-cv-00956-GMS, Sep. 1, 2016.
Exhibit A Case 1:12-cv-00956-GMS, Jul. 22, 2016.
Exhibit B Case 1:12-cv-00956-GMS, Jul. 22, 2016.
Exhibit B Case 1:12-cv-00956-GMS, Sep. 1, 2016.
Exhibit M, Case 1:12-cv-00956-GMS dated Oct. 4, 2016.
Exhibit N, Case 1:12-cv-00956-GMS, Oct. 4, 2016.
Exhibit.2036, Email from Shlomo Ahal dated Aug. 28, 2006, iKVM Workplan.
Exhibit.2040, Email from Matt Amdur dated Feb. 20, 2007, KVM iSCI stability.
Exhibit.2042, Email from Tzach Schechner dated Mar. 1, 2007, Kashya org chart.
Exhibit.2043, Email from Allan Lipka dated Apr. 4, 2006, Diligence Follow Up Questions.
Exhibit.2044, Email from Yair Heller dated Apr. 6, 2006, Diligence follow up questions.
Exhibit.2045, Email from Karthik Rau dated Mar. 16, 2006, FW: Kashya scalability testing.
Exhibit.2056, Zerto's U.S. Appl. No. 13/039,446.
Exhibits A-E Dated Dec. 4, 2015.
Ezra PowerPoint attachment to Apr. 4, 2006 Email from Allan Lipka, Kashya Company Overview.
Initial Conference Call Transcript of Mar. 16, 2017 Before Hon Sally Gardner Lane, Patent Interference No. 106,070.
Kashya Architecture PowerPoint attachment to Apr. 4, 2006 email from A.Lipka.
Kashya KBX5000 Product Release 2.3 Administrators Guide, Jul. 11, 2006.
Kashya KBX5000 Version 2.3 Release Notes, May 15, 2006.
Kedem Annotated Copy of Claims, Patent Interference No. 106,070, Feb. 14, 2017.
Kedem Clean Copy of Claims, Patent Interference No. 106,070, Jan. 31, 2017.
Kedem Exhibit 1003, U.S. Appl. No. 2009/0254852 A1.
Kedem Exhibit 1016, Small Computer System Interface-2, American National Standard for Information Systems, Jan. 31, 1994.
Kedem Exhibit 1025, Taylor, Colleen "Red-hot DotCloud is Structure 2011 Launchpad Winner," Gigaom, Jun. 23, 2011.
Kedem Exhibit 1028, Yager, Tom, "Virtualization and I/O," Ahead of the Curve, InfoWorld, 25,15: ProQuest, p. 26, Apr. 10, 2006.
Kedem Exhibit 1033, Sherr, Micah et al., "Signaling vulnerabilities in wiretapping systems," University of Pennsylvania, Nov. 8, 2005.
Kedem List of Proposed Motions, Patent Interference No. 106,070, Mar. 8, 2017.
Kedem Notice of Related Proceedings, Patent Interference No. 106,070, Jan. 31, 2017.
Kedem Opposition 1, Kedem V. Assaf Natanzon before the Patent Trial and Appeal Board, Oct. 20, 2017.
Kedem Opposition 2, Kedem V. Assaf Natanzon before the Patent Trial and Appeal Board, Oct. 20, 2017.
Letter to Court from EMC regarding Aug. 16 letter to stay Case 1:12-cv-00956-GMS, Aug. 18, 2016.
Letter to Court from Zerto regarding staying brief regarding Royalty Rate Case 1:12-cv-00956-GMS, Aug. 16, 2015.
Letter to Judge from EMC regarding Court of Appeals Federal Circuit Order, Case 1:12-cv-00956-GMS, Jun. 19, 2017.
Letter to Judge Sleet from Adam Poff Regarding Defendants Response to Plaintiffs Letter of Jun. 19, 2017, Case 1:12-cv-00956-GMS, Aug. 21, 2017.
Memorandum regarding Royalties, Case 1:12-cv-00956-GMS, Aug. 10, 2017.
Memorandum United Stated District Court Delaware dated Mar. 31, 2016.
Natanzon Annotated Copy of Claims, Patent Interference No. 106,070, Feb. 14, 2017.
Natanzon Clean Copy of Claims, Patent Interference No. 106,070, Feb. 1, 2017.
Natanzon Exhibit 2069, Renewed Petition, Sep. 5, 2012.
Natanzon Exhibit 2070, Decision on Renewed Petition dated Sep. 21, 2012.
Natanzon Exhibit 2071, Response to Non-Final Office Action for U.S. Appl. No. 13/404,129.
Natanzon Exhibit 2072, Supplemental Application Data Sheet dated Jul. 11, 2017.
Natanzon List of Proposed Motions, Patent Interference No. 106,070, Mar. 8, 2017.
Natanzon Notice of Related Proceedings, Patent Interference No. 106,070, Feb. 1, 2017.
Natanzon Priority Statement, Jul. 7, 2017.
Natanzon Request for File Copies, Patent Interference No. 106,070, Feb. 1, 2017.
Non Confidential Joint Appendix Pt.2, U.S. Court of Appeals for Federal Circuit. Case 16-1856, Document 56-2, dated Jan. 18, 2017.
Non Confidential Joint Appendix Pt.3 U.S. Court of Appeals for Federal Circuit, Case 16-1856, Document 56-3, dated Jan. 18, 2017.
Non Confidential Joint Appendix vol. 1 Part 1 dated Jan. 18, 2017.
Non Confidential Joint Appendix vol. 1 Part 2 dated Jan. 18, 2017.
Non Confidential Joint Appendix Vo 1.2 Part 1 dated Jan. 18, 2017.
Non Confidential Joint Appendix Vo 1.2 Part 2 dated Jan. 18, 2017.
Non Confidential Joint Appendix vol. 3 dated Jan. 18, 2017.
Non-Confidential Joint Appendix in the United States Court of Appeals for the Federal Circuit, vol. I of III, Pages Appx1-1597, Case No. 2016-1856, -1883, Jan. 18, 2017.
Non-Confidential Joint Appendix in the United States Court of Appeals for the Federal Circuit, vol. II of III, Pages Appx1-1616-4883, Case No. 2016-1856, -1883, Jan. 18, 2017.
Non-Confidential Joint Appendix Part 1 Case 16-1856, Document 56-1 dated Jan. 18, 2017.
Non-Confidential Joint Appendix U.S. Pat. No. 6,073,209 in the United States Court of Appeals for the Federal Circuit, Case No. 2016-1856, -1883, Jan. 18, 2017.
Non-Confidential Joint Appendix U.S. Pat. No. 7,603,395 B1 in the United States Court of Appeals for the Federal Circuit, Case No. 2016-1856, -1883, Jan. 18, 2017.
Non-Confidential Joint Appendix vol. I of III, Pages Appx1-1597 in the United States Court of Appeals for the Federal Circuit, Case No. 2016-1856, -1883, Jan. 18, 2017.
Non-Confidential Joint Appendix vol. II of III, Pages Appx1616-4883 in the United States Court of Appeals for the Federal Circuit, Case No. 2016-1856, -1883, Jan. 18, 2017.
Non-Confidential Joint Appendix vol. III of III, Pages Appx4884-5884 in the United States Court of Appeals for the Federal Circuit, Case No. 2016-1856, -1883, Jan. 18, 2017.
Opposition of Cross-Appellants Emc Corporation and Emc Israel Development Center Ltd. To Appellant Zerto, Inc.'S Motion for Extension of Time To File Its Response/Reply Brief, Appeals from the United States District Court for the District of Delaware in No. 1:12-cv-00956-GMS, Judge Gregory M. Sleet, Sep. 30, 2016.
Order Authorizing Copies of Office Records, Patent Interference No. 106,070, dated Feb. 2, 2016.
Order Granting Extension of Time to file Opening Brief dated May 11, 2016.

(56) References Cited

OTHER PUBLICATIONS

Order Miscellaneous Bd. R. 104a, *Natanzon V. Kedem*, Jul. 11, 2017.
Order Motion Times March 16 Call, Patent Interference No. 106,070, Entered Mar. 20, 2017.
Order On Motion, United States Court of Appeals for the Federal Circuit, Case No. 2016-1856,-1883, Oct. 2016.
Order regarding Post-Trial Motion dated Mar. 31, 2016.
Plaintiff EMC and EMC Israel Development Center LTD., Bill of Costs in the United States District Court for Delaware, Case 1:12-cv-00956-GMS, Aug. 8, 2017.
PowerPoint attachment to Jan. 30, 2006 email from Christos Karamanlis. Project: Ezra Technical Due Diligence Meeting Notes, Mar. 28-31, 2006.
Standing Order Before the Board of Patent Appeals and Interferences entered Mar. 8, 2011.
Supplement to Natanzon Motion 2, Jul. 11, 2017.
Word attachment to Mar. 15, 2006 email from K.Rau, ESX Disaster Recovery Roadmap.
Zerto Continuation application as published U.S. Pat. No. 20160357593 A1.
Zerto, Inc.'s Appeal Brief in the United States District Court for the District of Delaware in No. 1:12-cv-00956-GMS, Judge Gregory M. Sleet, Aug. 5, 2016.
Zerto's Appeal Brief dated Aug. 5, 2016.
Zerto's Corrected Response and Reply Brief dated Dec. 21, 2016.
Zerto's Motion for Extension of Time to file its Initial Brief dated May 4, 2016.
Zerto's Opposition to the EMC Motion to Supplement the Record dated Dec. 21, 2015.
Office Action on U.S. Appl. No. 14/831,623 dated Feb. 22, 2018.
Office Action on U.S. Appl. No. 15/194,097 dated Feb. 20, 2018.
Office Action on U.S. Appl. No. 15/231,388 dated Feb. 23, 2018.
Office Action on U.S. Appl. No. 15/289,568 dated Mar. 29, 2018.
US Office Action on U.S. Appl. No. 14/831,623 dated Jul. 31, 2017 (7 pages).
US Office Action on U.S. Appl. No. 15/231,388 dated Aug. 29, 2017 (10 pages).
US Office Action on U.S. Appl. No. 15/240,847 dated Oct. 23, 2017 (23 pages).
Affidavit of Christopher Butler and Exhibit A regarding Ex. 1, dated Nov. 8, 2017.
Affidavit of Christopher Butler and Exhibit A regarding Exs., dated Nov. 8, 2017.
Clerk's Notice of Deficient Document, dated Nov. 30, 2017.
Declaration of Lisa Kieper, dated Nov. 13, 2017.
Kedem Exhibit 1035, Transcript of Video Deposition of Ziv Kedem, dated Dec. 7, 2017.
Kedem Exhibit 1036, Transcript of Video Deposition of Matthew Green, dated Dec. 13, 2017.
Kedem Exhibit 1037, Transcript of Video Deposition of Oded Kedem, dated Dec. 19, 2017.
Kedem Exhibit 1038, Kedem Objections to the Admissibility of Natanzon's Evidence (for exhibits and materials submitted with Natanzon Motions 1 and 2), dated Jul. 14, 2017.
Kedem Exhibit 1039, Kedem Objections to the Admissibility of Natanzon's Evidence (for exhibits and materials submitted with Natanzon Replies 1 and 2), dated Jan. 12, 2018.
Kedem Miscellaneous Motion 1 (to exclude Natanzon's Evidence, dated Jan. 17, 2018.
Kedem Notice of Filing and Service of Deposition Transcripts, Patent Interference No. 106,070, dated Jan. 5, 2018.
Kedem Notice of Service of Supplemental Evidence, dated Nov. 13, 2017.
Kedem Objections to the Admissibility of Natanzon's Evidence (for exhibits and materials submitted with Natanzon Replies 1 and 2), dated Jan. 12, 2018.
Kedem Opposition to Natanzon Motion to Exclude Evidence, dated Feb. 1, 2018.
Kedem Reply 1 (to Exclude Natanzon Evidence), dated Feb. 7, 2018.
Kedem Request for Oral Argument, dated Jan. 17, 2018.
Kedem Updated Exhibit List, dated Jan. 17, 2018.
Kedem Updated Exhibit List, Patent Interference No. 106,070, dated Jan. 5, 2018.
Natanzon Exhibit 2082, Kedem Opposition 1 to Natanzon Motion for Judgment under 35 U.S.C. sec. 102(f), dated Oct. 20, 2017.
Natanzon Exhibit 2085, Zerto, Manchester VMUG 2014 and Technical Overview.
Natanzon Exhibit 2086, LinkedIn Profile of Darren Swift, Rubrik, Inc., dated Dec. 5, 2017.
Natanzon Exhibit 2087, Cisco MDS 9000 Family SANTap with EMC RecoverPoint Design Guide, dated Apr. 2009.
Natanzon Exhibit 2088, Disk Backup, A look inside continuous data protection software, dated Dec. 6, 2017.
Natanzon Exhibit 2090, American Heritage Dictionary, Second College Edition, p. 669.
Natanzon Exhibit 2091, Webster's Ninth New Collegiate Dictionary, Miriam-Webster, p. 630 (1990).
Natanzon Exhibit 2094, Denning, Dorothy E., Cryptography and Data Security, Addison-Wesley Publishing Company, Inc., 1982.
Natanzon Exhibit 2095, U.S. Patent Application No. 2007/0220311 A1, published Sep. 20, 2007.
Natanzon Exhibit 2096, Webster's Ninth New Collegiate Dictionary, Miriam-Webster, p. 1206 (1990).
Natanzon Exhibit 2097, Assignment for U.S. Patent Application No. 2011/356,920, Reel 017879 Frame 0115-0117, dated May 12, 2006.
Natanzon Exhibit 2098, US Office Action for Appl. U.S. Appl. No. 13/039,446 dated Jan. 2, 2015.
Natanzon Exhibit 2099, Natanzon Objections to the Admissibility of Kedem's Evidence (for exhibits and materials submitted with Kedem Oppositions 1 and 2), dated Oct. 27, 2017.
Natanzon Motion to Exclude, dated Jan. 17, 2018.
Natanzon Notice of Deposition of Oded Kedem, dated Dec. 1, 2017.
Natanzon Notice of Deposition of Professor Matthew Green, dated Dec. 1, 2017.
Natanzon Notice of Deposition of Ziv Kedem, dated Dec. 1, 2017.
Natanzon Notice of Filing Deposition Transcripts, Patent Interference No. 106,070, dated Oct. 19, 2017.
Natanzon Objections to the Admissibility of Kedem's Evidence, for exhibits and materials submitted with Kedem Oppositions 1 and 2, dated Oct. 27, 2017.
Natanzon Opposition to Kedem Miscellaneous Motion 1 (to exclude Natanzon's Evidence), dated Feb. 1, 2018.
Natanzon Reply 1, dated Jan. 9, 2018.
Natanzon Reply 2, dated Jan. 9, 2018.
Natanzon Request for Oral Argument, dated Jan. 17, 2018.
Natanzon Updated Exhibit List, Patent Interference No. 106,070, dated Oct. 19, 2017.
Notice of Stipulation to Extend Time Periods 4-6, dated Nov. 30, 2017.
Reply in Support of Natanzon Motion to Exclude, dated Feb. 7, 2018.
Non-Final Office Action on U.S. Appl. No. 14/831,623 dated Sep. 13, 2018.
Amended Order Governing Mediation Conferences and Meditation Statements for The United States District Court For the District of Delaware Case 1:12-cv-00956-GMS dated Jun. 1, 2016.
Decision—Motion—Bd. R. 5(a): 121(a) (3), Patent Interference No. 106,070, Sep. 18, 2017.
Declaration of Lucas Silva in Support of Zerto's Opposition to EMC's Renewed Motion for An Ongoing Royalty Rate Covering Post Judgment Sales in the United States District Court for Delaware Case 1:12-cv-00956-GMS, Sep. 1, 2016.
Declaration of Nathan Speed in Support of EMC's Reply Brief in Support of its Motion for a Renewed Ongoing Royalty in the United States District Court for Delaware Case 1:12-vc-00956-GMS dated Oct. 4, 2016.
Declaration of Nathan Speed In Support of Plaintiff's Bill of Costs, Case 1:12-cv-00956-GMS, Aug. 8, 2017.
E-mail from Christos Karamanolis, dated Apr. 3, 2006, RE: Ezra feedback.

(56) References Cited

OTHER PUBLICATIONS

Email from U.S. Court of Appeals for the Federal Circuit re Nov. 30, 2017 Clerk's Notice of Deficient Document.
Email from USPTO re Mar. 31, 2017 Filing Submission for 106070.
EMC Corporation and EMC Israel Development Center Ltd.'s Docketing Statement in the United States Court of Appeals for the Federal Circuit, Case No. 16-1856, 16-1883, Apr. 29, 2016.
EMC Corporation's Corrected Docketing Statement in the United States Court of Appeals for the Federal Circuit, Case No. 17-2519, Sep. 22, 2017.
EMC's corrected docketing statement dated Sep. 22, 2017.
EMC's Docketing statement dated Apr. 29, 2016.
EMC's Motions for Redaction of Electronic Transcripts and Notice of Lodging Redacted Transcripts and Proposed Order dated Apr. 19, 2016.
EMC's Notice of Intent to Redact dated Apr. 5, 2016.
EMC's Renewed Motion for an Ongoing Royalty Rate Covering Post-Judgement Sales in the United States District Court for the District of Delaware Case 1:12-cv-00956-GMS dated Jul. 14, 2016.
Exhibit O, Case 1:12-cv-00956-GMS, Oct. 4, 2016.
Exhibit P, Case 1:12-cv-00956-GMS, Oct. 4, 2016.
Interference Efiling Receipt, No. 106070, Jan. 31, 2017.
Judgment—Bd. R. 127 (a), issued in Patent Interference No. 106,070, Dec. 20, 2018.
Judgment from the United States Court of Appeals for the Federal Circuit dated Jun. 12, 2017.
Kedem Exhibit 1019, "Kedem Brothers Launch Zerto, Bringing Disaster Recovery to the Cloud," www.web.archive.org.
Kedem Exhibit List, Patent Interference No. 106,070, dated Oct. 20, 2017.
Kedem Notice of Change of Lead and Backup Counsel, Patent Interference No. 106,070 (Sep. 12, 2017).
Kedem Notice of Deposition for Alan Lipka for Sep. 29, 2017, Patent Interference No. 106,070 (Sep. 11, 2017).
Kedem Notice of Deposition for Chris Karamanolis for Sep. 25 and 26, 2017, Patent Interference No. 106,070 (Sep. 11, 2017).
Kedem Notice of Deposition for Ian Jestice for Sep. 28, 2017, Patent Interference No. 106,070 (Sep. 11, 2017).
Kedem Notice of Deposition for Matt Amdur for Sep. 26, 2017, Patent Interference No. 106,070 (Sep. 11, 2017).
Kedem Notice or Deposition of Matan Gilat for Sep. 14, 2017, Patent Interference No. 106,070 (Sep. 11, 2017).
Kedem Notice of Lead and Backup Counsel, Patent Interference No. 106,070, Jan. 31, 2017.
Kedem Notice of Real Party in Interest, Patent Interference No. 106,070, Jan. 31, 2017.
Kedem Notice of Settlement Discussions, Patent Interference No. 106,070, May 4, 2017.
Kedem Objections to the Admissibility of Natanzon's Evidence - for exhibits and materials submitted with Natanzon Motions 1 and 2, Patent Interference No. 106,070, dated Jul. 14, 2017.
Kedem Priority Statement, Patent Interference No. 106,070, dated Jul. 7, 2017.
Kedem Request for File Copies, Patent Interference No. 106,070, dated Jan. 31, 2017.
Letter from EMC to court enclosing appendix pages dated May 8, 2017.
Letter from Zerto to Court enclosing appendix pages dated May 9, 2017.
Mandate from Court of Appeals for Federal Circuit, Case 1:12-cv-00956-GMS, dated Jul. 19, 2017.
Mandate from United State Court of Appeals for the Federal Circuit dated Jul. 19, 2017.
Natanzon Exhibit 2005, Declaration of Matt Amdur, Patent Interference No. 106,070, Jun. 29, 2017.
Natanzon Exhibit 2006, Declaration of Matan Gilat, Patent Interference No. 106,070, Jun. 29, 2017.
Natanzon Exhibit 2075, Declaration of Nathan R. Speed in Support of Motion for Admission Pro Hac Vice, Patent Interference No. 106,070, Sep. 11, 2017.
Natanzon Exhibit 2076, Transcript of Deposition of Matan Gilat, Sep. 14, 2017.
Natanzon EXHIBIT 2077, Transcript of Deposition of Allan Lipka, Sep. 28, 2017.
Natanzon EXHIBIT 2078, Transcript of Deposition of Allan Lipka, Sep. 29, 2017.
Natanzon Exhibit 2079, Transcript or Deposition or Christos Karamanolis, Sep. 25, 2017.
Natanzon Exhibit 2080, Transcript of Deposition of Christos Karamanolis, Sep. 26, 2017.
Natanzon Exhibit 2081, Transcript of Deposition of Matthew Amdur, Sep. 26, 2017.
Natanzon Exhibit List, Patent Interference No. 106,070, dated Jul. 7, 2017.
Natanzon Motion 1, Patent Interference No. 106, 070, dated Jul. 7, 2017.
Natanzon Motion 2 (to correct inventorship), Patent Interference No. 106,070, dated Jul. 7, 2017.
Natanzon Notice of Change in Lead and Backup Counsel, Patent Interference No. 106,070, Jun. 6, 2017.
Natanzon Notice of Lead and Backup Counsel, Patent Interference No. 106,070, Feb. 1, 2017.
Natanzon Notice of Real Party in Interest, Patent Interference No. 106,070, Feb. 1, 2017.
Natanzon Notice of Service of Supplemental Evidence, Patent Interference No. 106,070, dated Jul. 28, 2017.
Natanzon Notice of Serving Priority Statement, Patent Interference No. 106,070, Jul. 10, 2017.
Natanzon Unopposed Miscellaneous Motion 1 (Request for pro hac vice admission of Nathan R. Speed), Patent Interference No. 106,070 (Sep. 12, 2017).
Natanzon Updated Exhibit List, Patent Interference No. 106,070, dated Jul. 11, 2017.
Natanzon Updated Exhibit List, Patent Interference No. 106,070, Jul. 28, 2017.
Natanzon Updated Exhibit List, Patent Interference No. 106,070, Sep. 12, 2017.
Notice of Allowance for U.S. Appl. No. 13/175,898 dated Jul. 16, 2015.
Notice of Allowance on U.S. Appl. No. 15/194,097 dated Jul. 27, 2018.
Notice or Allowance on U.S. Appl. No. 15/194,097 dated Oct. 16, 2018.
Notice of Allowance on U.S. Appl. No. 15/231,388 dated Jan. 18, 2019.
Notice of Allowance on U.S. Appl. No. 15/231,388 dated Aug. 16, 2018.
Notice of Allowance on U.S. Appl. No. 15/231,388 dated Oct. 12, 2018.
Notice of Allowance on U.S. Appl. No. 15/240,847 dated Nov. 15, 2018.
Notice of Allowance on U.S. Appl. No. 15/289,568 dated Jul. 5, 2018.
Notice of Allowance on U.S. Appl. No. 15/289,568 dated Oct. 23, 2018.
Notice of Appeal by Zerto dated Apr. 14, 2016.
Notice Of Docket, United States Court of Appeals for the Federal Circuit, Case 1:12-cv-00956-GMs, Sep. 8, 2017.
Notice of Docketing dated Apr. 15, 2016.
Notice of Docketing dated Apr. 19, 2016.
Notice of Docketing for the United State Court of Appeals for the Federal Circuit, 17-2519—EMC Corporation V. Zerto Inc, Sep. 8, 2017.
Notice Of Docketing on Sep. 8, 2017 in the United States Court of Appeals for the Federal Circuit.
Notice of Entry of Judgment Without Opinion Entered Jun. 12, 2016, Case 1:12-cv-00956-GMS, Jun. 13, 2016.
Notice of Entry of Judgment without Opinion in the United States Court of Appeals for the Federal Court, Case No. 16-1856, Jun. 12, 2017.
Notice of Judgment without Opinion dated Jun. 12, 2017.
Notice of Subsequent Authority dated Jan. 5, 2016.

(56) References Cited

OTHER PUBLICATIONS

Notice of Withdrawal of Certain Pro Hac Vice Counsel Aaron Moore dated Apr. 11, 2016.
Notice of Withdrawal of Monte Squire dated Nov. 11, 2015.
Order Appellant Zerto's Response and Reply Brief dated Dec. 7, 2016.
Order Governing Mediation Conferences and Mediation Statements dated Apr. 19, 2016.
Order Regarding Royalties In the District Court for Delaware, Case 1:12-cv-009560-GMS, Aug. 10, 2017.
Order rejecting EMC Corporation's Opening Brief in the United States Court of Appeals for the Federal Circuit, Case No. 16-1856, Sep. 15, 2016.
Order Rejecting EMC's Opening Brief dated Sep. 15, 2016.
Order-Miscellaneous- BS.R 104(a), Patent Interference No. 106,070, dated Jun. 15, 2017.
Plaintiffs Notice of Cross Appeal dated Apr. 18, 2016.
Zerto Inc Docketing Statement dated Apr. 29, 2016.
Zerto, Inc.'s Docketing Statement in the United States Court of Appeals for the Federal Circuit, Case No. 16-1856, 16-1883, Apr. 29, 2016.
Zerto's Docketing Statement dated Sep. 22, 2017.
Zerto's Docketing Statement in the United States Court of Appeals for the Federal Circuit, Case No. 17-2519, Sep. 22, 2017.
Zerto's Notice of Intent to Redact dated Apr. 5, 2016.
Zertos's Citation of Supplemental Authority and Matthew Lowrie's certificate of service dated May 3, 2017.
Non-Final Office Action on U.S. Appl. No. 14/831,623 dated Sep. 20, 2019.
Notice of Allowance on U.S. Appl. No. 13/039,446 dated Jan. 13, 2020.
Notice of Allowance on U.S. Appl. No. 13/039,446 dated Nov. 21, 2019.
Notice of Allowance on U.S. Appl. No. 15/194,097 dated Dec. 30, 2019.
Notice of Allowance on U.S. Appl. No. 15/231,388 dated Jan. 23, 2020.
Final Office Action on U.S. Appl. No. 14/831,623, dated May 6, 2019, 14 pages.
Natanzon Decision on Rehearing—Bd. R. 125(c), Patent Interference No. 106,070, Apr. 30, 2019.
Natanzon Kedem Opposition 5 (to Natanzon Motion 5, Request for Rehearing) Patent Interference No. 106,070, Mar. 8, 2019.
Natanzon Miscellaneous Motion 5 (Request for Hearing of Decision and Judgement) Patent Interference No. 106,070, Jan. 22, 2019.
Natanzon Order-Authorizing Opposition and Reply—Bd. R. 125(c)(4), Patent Interference No. 106,070, Feb. 6, 2019.
Natanzon Reply 5 (to Opposition to Request for Hearing of Decision and Judgement), Patent Interference No. 106,070, Mar. 22, 2019.
Office Action for U.S. Appl. No. 13/367,448 dated Apr. 26, 2013, 19 pages.
US Final Office Action on U.S. Appl. No. 16/654,557 dated Dec. 28, 2020 (26 pages).
US Non-Final Office Action on U.S. Appl. No. 16/654,557 dated Aug. 13, 2020 (23 pages).
US Notice of Allowance on U.S. Appl. No. 16/654,557 dated Mar. 4, 2021 (11 pages).

\* cited by examiner

FIG. 5

METHODS AND APPARATUS FOR PROVIDING HYPERVISOR LEVEL DATA SERVICES FOR SERVER VIRTUALIZATION

CROSS REFERENCES TO RELATED APPLICATIONS

This application is a continuation-in-part of U.S. application Ser. No. 13/039,446, entitled METHODS AND APPARATUS FOR PROVIDING HYPERVISOR LEVEL DATA SERVICES FOR SERVER VIRTUALIZATION, filed on Mar. 3, 2011 by inventor Ziv Kedem, which claims priority benefit of U.S. Provisional Application No. 61/314,589, entitled METHODS AND APPARATUS FOR PROVIDING HYPERVISOR LEVEL DATA SERVICES FOR SERVER VIRTUALIZATION, filed on Mar. 17, 2010 by inventor Ziv Kedem.

FIELD OF THE INVENTION

The present invention relates to virtual server computing environments.

BACKGROUND OF THE INVENTION

Data center virtualization technologies are now well adopted into information technology infrastructures. As more and more applications are deployed in a virtualized infrastructure, there is a growing need for recovery mechanisms to support mission critical application deployment, while providing complete business continuity and disaster recovery.

Virtual servers are logical entities that run as software in a server virtualization infrastructure, referred to as a "hypervisor". Examples of hypervisors are VMWARE® ESX manufactured by VMware, Inc. of Palo Alto, Calif., HyperV manufactured by Microsoft Corporation of Redmond, Wash., XENSERVER® manufactured by Citrix Systems, Inc. of Fort Lauderdale, Fla., Redhat KVM manufactured by Redhat, Inc. of Raleigh, N.C., and Oracle VM manufactured by Oracle Corporation of Redwood Shores, Calif. A hypervisor provides storage device emulation, referred to as "virtual disks", to virtual servers. Hypervisor implements virtual disks using back-end technologies such as files on a dedicated file system, or raw mapping to physical devices.

As distinct from physical servers that run on hardware, virtual servers run their operating systems within an emulation layer that is provided by a hypervisor. Although virtual servers are software, nevertheless they perform the same tasks as physical servers, including running server applications such as database applications, customer relation management applications and MICROSOFT EXCHANGE SERVER®. Most applications that run on physical servers are portable to run on virtual servers. As distinct from virtual desktops that run client side applications and service individual users, virtual servers run applications that service a large number of clients.

As such, virtual servers depend critically on data services for their availability, security, mobility and compliance requirements. Data services include inter alia continuous data protection, disaster recovery, remote replication, data security, mobility, and data retention and archiving policies.

Conventional replication and disaster recovery systems were not designed to deal with the demands created by the virtualization paradigm. Most conventional replication systems are not implemented at the hypervisor level, with the virtual servers and virtual disks, but instead are implemented at the physical disk level. As such, these conventional systems are not fully virtualization-aware. In turn, the lack of virtualization awareness creates an operational and administrative burden, and a certain degree of inflexibility.

It would thus be of advantage to have data services that are fully virtualization-aware.

SUMMARY OF THE DESCRIPTION

Aspects of the present invention relate to a dedicated virtual data service appliance (VDSA) within a hypervisor that can provide a variety of data services. Data services provided by the VDSA include inter alia replication, monitoring and quality of service. The VDSA is fully application-aware.

In an embodiment of the present invention, a tapping filter driver is installed within the hypervisor kernel. The tapping driver has visibility to I/O requests made by virtual servers running on the hypervisor.

A VDSA runs on each physical hypervisor. The VDSA is a dedicated virtual server that provides data services; however, the VDSA does not necessarily reside in the actual I/O data path. When a data service processes I/O asynchronously, the VDSA receives the data outside the data path.

Whenever a virtual server performs I/O to a virtual disk, the tapping driver identifies the I/O requests to the virtual disk. The tapping driver copies the I/O requests, forwards one copy to the hypervisor's backend, and forwards another copy to the VDSA.

Upon receiving an I/O request, the VDSA performs a set of actions to enable various data services. A first action is data analysis, to analyze the data content of the I/O request and to infer information regarding the virtual server's data state. E.g., the VDSA may infer the operating system level and the status of the virtual server. This information is subsequently used for reporting and policy purposes.

A second action, optionally performed by the VDSA, is to store each I/O write request in a dedicated virtual disk for journaling. Since all I/O write requests are journaled on this virtual disk, the virtual disk enables recovery data services for the virtual server, such as restoring the virtual server to an historical image.

A third action, optionally performed by the VDSA, is to send I/O write requests to different VDSAs, residing on hypervisors located at different locations, thus enabling disaster recovery data services.

The hypervisor architecture of the present invention scales to multiple host sites, each of which hosts multiple hypervisors. The scaling flexibly allows for different numbers of hypervisors at different sites, and different numbers of virtual services and virtual disks within different hypervisors. Each hypervisor includes a VDSA, and each site includes a data services manager to coordinate the VSDA's at the site, and across other sites.

Embodiments of the present invention enable flexibly designating one or more virtual servers within one or more hypervisors at a site as being a virtual protection group, and flexibly designating one or more hypervisors, or alternatively one or more virtual servers within one or more hypervisors at another site as being a replication target for the virtual protection group. Write order fidelity is maintained for virtual protection groups. A site may comprise any number of source and target virtual protection groups. A virtual protection group may have more than one replication target. The number of hypervisors and virtual servers within a virtual protection group and its replication target are not required to be the same.

There is thus provided in accordance with an embodiment of the present invention a cross-host multi-hypervisor system, including a plurality of host sites, each site including at least one hypervisor, each of which includes at least one virtual server, at least one virtual disk that is read from and written to by the at least one virtual server, a tapping driver in communication with the at least one virtual server, which intercepts write requests made by any one of the at least one virtual server to any one of the at least one virtual disk, and a virtual data services appliance, in communication with the tapping driver, which receives the intercepted write requests from the tapping driver, and which provides data services based thereon, and a data services manager for coordinating the virtual data services appliances at the site, and a network for communicatively coupling the plurality of sites, wherein the data services managers coordinate data transfer across the plurality of sites via the network.

BRIEF DESCRIPTION OF THE DRAWINGS

The present invention will be more fully understood and appreciated from the following detailed description, taken in conjunction with the drawings in which:

FIG. 5 is a user interface screenshot of bi-directional replication of virtual protection groups, in accordance with an embodiment of the present invention;

LIST OF APPENDICES

Appendix I is an application programming interface for virtual replication site controller web services, in accordance with an embodiment of the present invention;

Appendix II is an application programming interface for virtual replication host controller web services, in accordance with an embodiment of the present invention;

Appendix III is an application programming interface for virtual replication protection group controller web services, in accordance with an embodiment of the present invention;

Appendix IV is an application programming interface for virtual replication command tracker web services, in accordance with an embodiment of the present invention; and Appendix V is an application programming interface for virtual replication log collector web services, in accordance with an embodiment of the present invention.

DETAILED DESCRIPTION

Aspects of the present invention relate to a dedicated virtual data services appliance (VDSA) within a hypervisor, which is used to provide a variety of hypervisor data services. Data services provided by a VDSA include inter alia replication, monitoring and quality of service.

Figure 1:
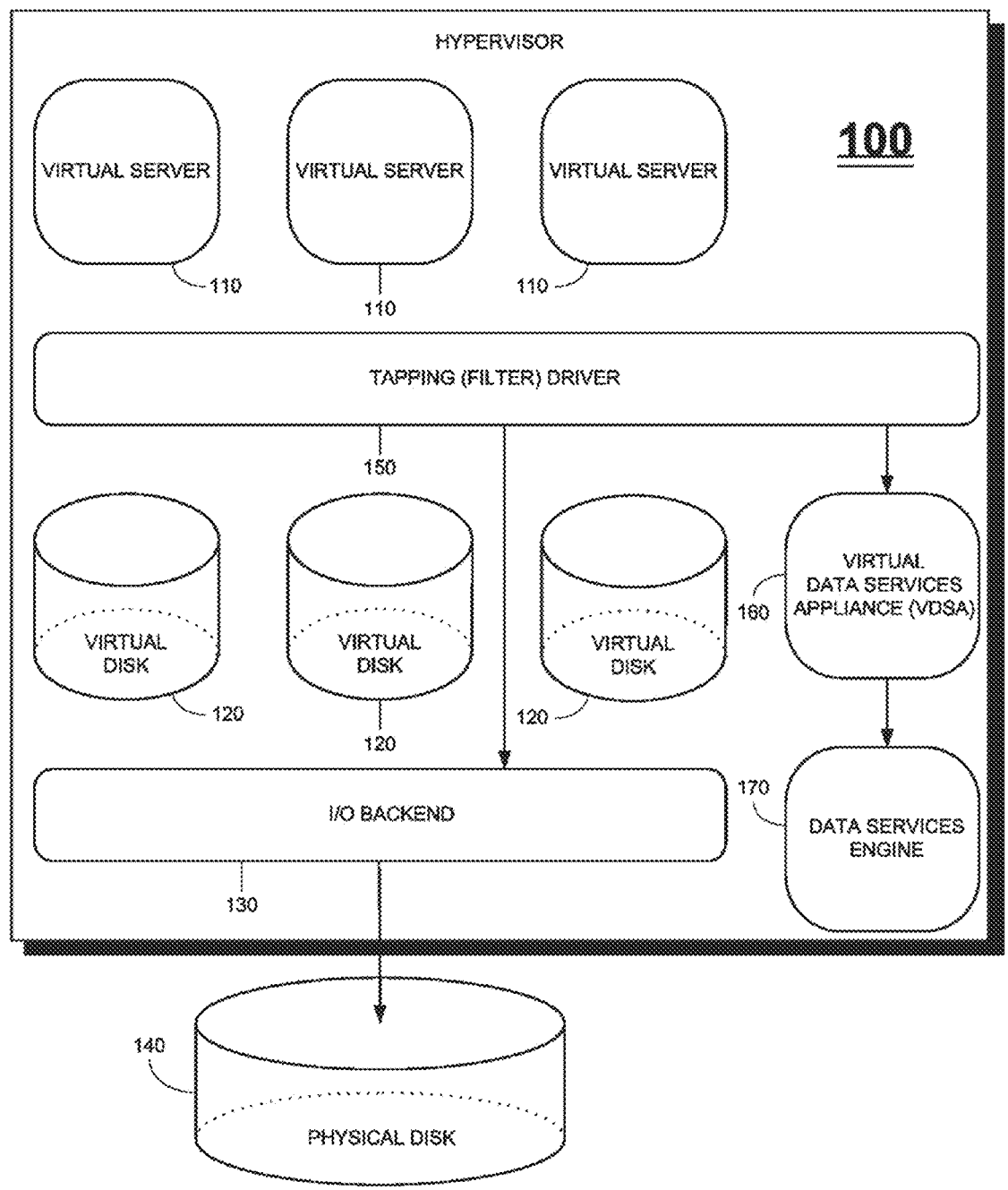
FIG. 1 is a simplified block diagram of a hypervisor architecture that includes a tapping driver and a virtual data services appliance, in accordance with an embodiment of the present invention.

Reference is made to FIG. 1, which is a simplified block diagram of a hypervisor architecture that includes a tapping driver and a VDSA, in accordance with an embodiment of the present invention. Shown in FIG. 1 is a hypervisor 100 with three virtual servers 110, three virtual disks 120, an I/O backend 130 and a physical storage array 140. Hypervisor 100 uses a single physical server, but runs multiple virtual servers 110. Virtual disks 120 are a storage emulation layer that provide storage for virtual servers 110. Virtual disks 120 are implemented by hypervisor 100 via I/O backend 130, which connects to physical disk 140.

Hypervisor 100 also includes a tapping driver 150 installed within the hypervisor kernel. As shown in FIG. 1, tapping driver 150 resides in a software layer between virtual servers 110 and virtual disks 120. As such, tapping driver 150 is able to access I/O requests performed by virtual servers 110 on virtual disks 120. Tapping driver 150 has visibility to I/O requests made by virtual servers 110.

Hypervisor 100 also includes a VDSA 160. In accordance with an embodiment of the present invention, a VDSA 160 runs on a separate virtual server within each physical hypervisor. VDSA 160 is a dedicated virtual server that provides data services via one or more data services engines 170. However, VDSA 160 does not reside in the actual I/O data path between I/O backend 130 and physical disk 140. Instead, VDSA 160 resides in a virtual I/O data path.

Whenever a virtual server 110 performs I/O on a virtual disk 120, tapping driver 150 identifies the I/O requests that the virtual server makes. Tapping driver 150 copies the I/O requests, forwards one copy via the conventional path to I/O backend 130, and forwards another copy to VDSA 160. In turn, VDSA 160 enables the one or more data services engines 170 to provide data services based on these I/O requests.

Figure 2:
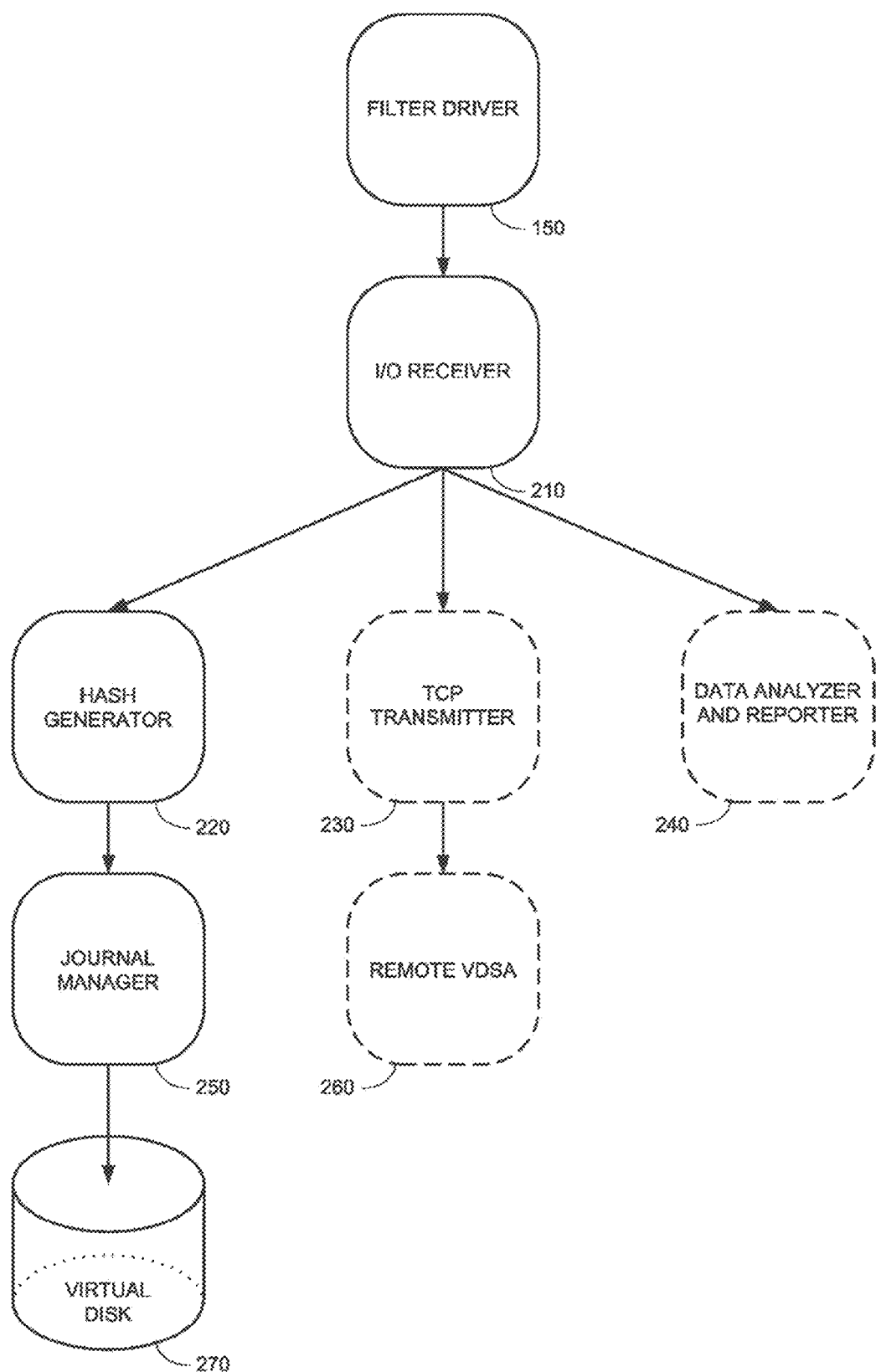
FIG. 2 is a simplified data flow chart for a virtual data services appliance, in accordance with an embodiment of the present invention.

Reference is made to FIG. 2, which is a simplified data flow chart for a VDSA, in accordance with an embodiment of the present invention. Shown in FIG. 2 are an I/O receiver 210, a hash generator 220, a TCP transmitter 230, a data analyzer and reporter 240, a journal manager 250 and a remote VDSA 260. Remote VDSA 260 resides on different physical hardware, at a possibly different location.

As shown in FIG. 2, I/O receiver 210 receives an intercepted I/O request from tapping driver 150. VDSA 160 makes up to three copies of the received I/O requests, in order to perform a set of actions which enable the one or more data services engines 170 to provide various services.

A first copy is stored in persistent storage, and used to provide continuous data protection. Specifically, VDSA 160 sends the first copy to journal manager 250, for storage in a dedicated virtual disk 270. Since all I/O requests are journaled on virtual disk 270, journal manager 250 provides recovery data services for virtual servers 110, such as restoring virtual servers 110 to an historical image. In order to conserve disk space, hash generator 220 derives a one-way hash from the I/O requests. Use of a hash ensures that only a single copy of any I/O request data is stored on disk.

An optional second copy is used for disaster recovery. It is sent via TCP transmitter 230 to remote VDSA 260. As such, access to all data is ensured even when the production hardware is not available, thus enabling disaster recovery data services.

An optional third copy is sent to data analyzer and reporter 240, which generates a report with information about the content of the data. Data analyzer and reporter 240 analyzes data content of the I/O requests and infers information regarding the data state of virtual servers 110. E.g., data analyzer and reporter 240 may infer the operating system level and the status of a virtual server 110.

Figure 3:
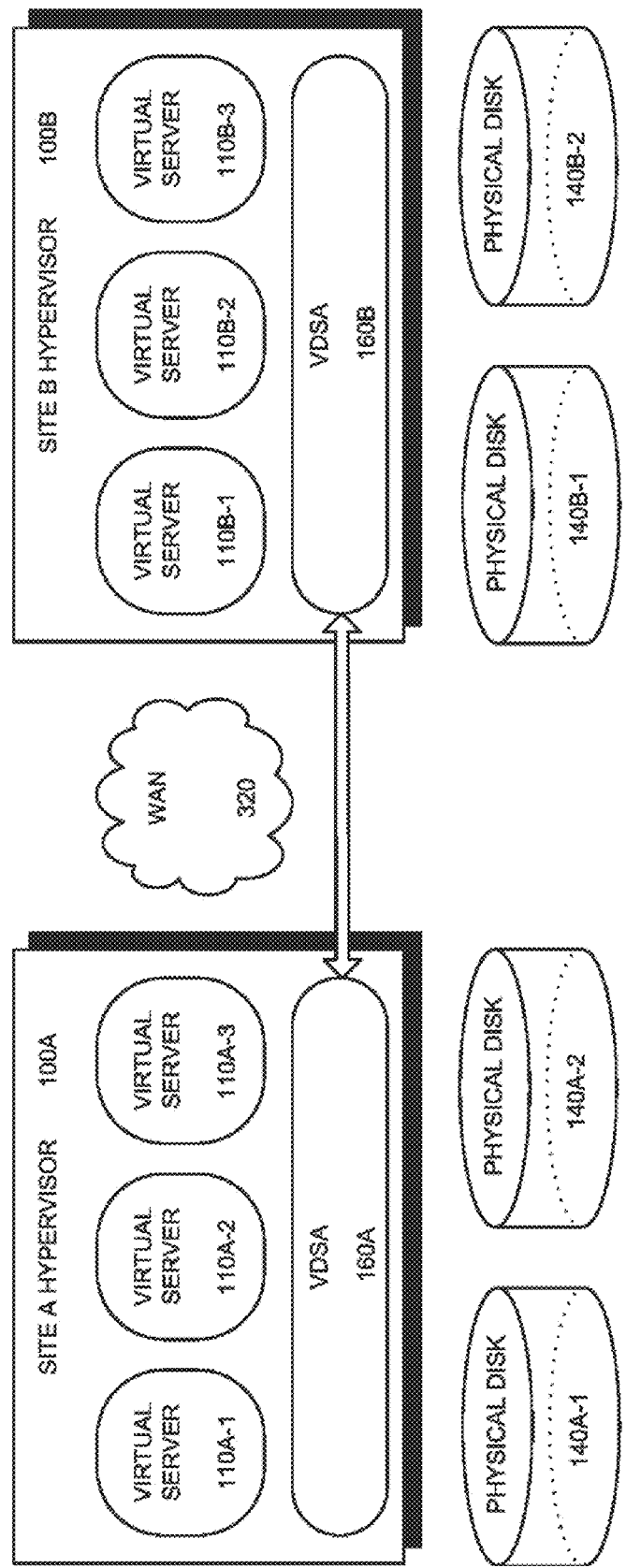
FIG. 3 is a simplified block diagram of a virtual replication system, in accordance with an embodiment of the present invention.

Reference is made to FIG. 3, which is a simplified block diagram of a virtual replication system, in accordance with an embodiment of the present invention. Shown in FIG. 3 is a protected site designated Site A, and a recovery site designated Site B. Site A includes a hypervisor 100A with three virtual servers 110A-1, 110A-2 and 110A-3, and a VDSA 160A. Site A includes two physical disks 140A-1 and 140A-2. Site B includes a hypervisor 100B with a VDSA 160B. Site B includes two physical disks 140B-1 and 140B-2. All or some of virtual servers 110A-1, 110A-2 and 110A-3 may be designated as protected. Once a virtual server is designated as protected, all changes made on the virtual server are replicated at the recovery site.

In accordance with an embodiment of the present invention, every write command from a protected virtual server in hypervisor 100A is intercepted by tapping driver 150 (FIG. 1) and sent asynchronously by VDSA 160A to VDSA 160B for replication, via a wide area network (WAN) 320, while the write command continues to be processed by the protected server.

At Site B, the write command is passed to a journal manager 250 (FIG. 2), for journaling on a Site B virtual disk 270 (FIG. 2). After every few seconds, a checkpoint is written to the Site B journal, and during a recovery one of the checkpoints may be selected for recovering to that point. Additionally, checkpoints may be manually added to the Site B journal by an administrator, along with a description of the checkpoint. E.g., a checkpoint may be added immediately prior to an event taking place that may result in the need to perform a recovery, such as a planned switch over to an emergency generator.

In addition to write commands being written to the Site B journal, mirrors 110B-1, 110B-2 and 110B-3 of the respective protected virtual servers 110A-1, 110A-2 and 110A-3 at Site A are created at Site B. The mirrors at Site B are updated at each checkpoint, so that they are mirrors of the corresponding virtual servers at Site A at the point of the last checkpoint. During a failover, an administrator can specify that he wants to recover the virtual servers using the latest data sent from the Site A. Alternatively the administrator can specify an earlier checkpoint, in which case the mirrors on the virtual servers 110B-1, 110-B-2 and 110B-3 are rolled back to the earlier checkpoint, and then the virtual servers are recovered to Site B. As such, the administrator can recover the environment to the point before any corruption, such as a crash or a virus, occurred, and ignore the write commands in the journal that were corrupted.

VDSAs 160A and 160B ensure write order fidelity; i.e., data at Site B is maintained in the same sequence as it was written at Site A. Write commands are kept in sequence by assigning a timestamp or a sequence number to each write at Site A. The write commands are sequenced at Site A, then transmitted to Site B asynchronously, then reordered at Site B to the proper time sequence, and then written to the Site B journal.

The journal file is cyclic; i.e., after a pre-designated time period, the earliest entries in the journal are overwritten by the newest entries.

It will be appreciated by those skilled in the art that the virtual replication appliance of the present invention operates at the hypervisor level, and thus obviates the need to consider physical disks. In distinction, conventional replication systems operate at the physical disk level. Embodiments of the present invention recover write commands at the application level. Conventional replication systems recover write commands at the SCSI level. As such, conventional replication systems are not fully application-aware, whereas embodiment of the present invention are full application-aware, and replicate write commands from an application in a consistent manner.

The present invention offers many advantages.

Hardware Agnostic: Because VDSA 160 manages recovery of virtual servers and virtual disks, it is not tied to specific hardware that is used at the protected site or at the recovery site. The hardware may be from the same vendor, or from different vendors. As long as the storage device supports the iSCSI protocol, any storage device, known today or to be developed in the future, can be used.

Fully Scalable: Because VDSA 160 resides in the hypervisor level, architectures of the present invention scale to multiple sites having multiple hypervisors, as described hereinbelow with reference to FIG. 4.

Efficient Asynchronous Replication: Write commands are captured by VDSA 160 before they are written to a physical disk at the protected site. The write commands are sent to the recovery site asynchronously, and thus avoid long distance replication latency. Moreover, only delta changes are sent to the recovery site, and not a whole file or disk, which reduces the network traffic, thereby reducing WAN requirements and improving recovery time objective and recovery point objective.

Control of Recovery: An administrator controls when a recovery is initiated, and to what point in time it recovers.

Near-Zero Recovery Point Objective (RPO): VDSA 160 continuously protects data, sending a record of every write command transacted at the protected site to the recovery site. As such, recovery may be performed within a requested RPO.

Near-Zero Recovery Time Objective (RTO): During recovery the mirrors of the protected virtual servers are recovered at the recovery site from VDSA 160B, and synchronized to a requested checkpoint. In accordance with an embodiment of the present invention, during synchronization and while the virtual servers at the recovery site are not yet fully synchronized, users can nevertheless access the virtual servers at the recovery site. Each user request to a virtual server is analyzed, and a response is returned either from the virtual server directly, or from the journal if the information in the journal is more up-to-date. Such analysis of user requests continues until the recovery site virtual environment is fully synchronized.

WAN Optimization between Protected and Recovery Sites: In accordance with an embodiment of the present invention, write commands re compressed before being sent from VDSA 160A to VDSA 160B, with throwing used to prioritize network traffic. As such, communication between the protected site and the recovery site is optimized.

WAN Failover Resilience: In accordance with an embodiment of the present invention, data is cached prior to being transmitted to the recovery site. If WAN 320 goes down, the cached data is saved and, as soon as WAN 320 comes up again, the data is sent to the recovery site and both sites are re-synchronized.

Single Point of Control: In accordance with an embodiment of the present invention, both the protected and the recovery site are managed from the same client console.

Figure 4:
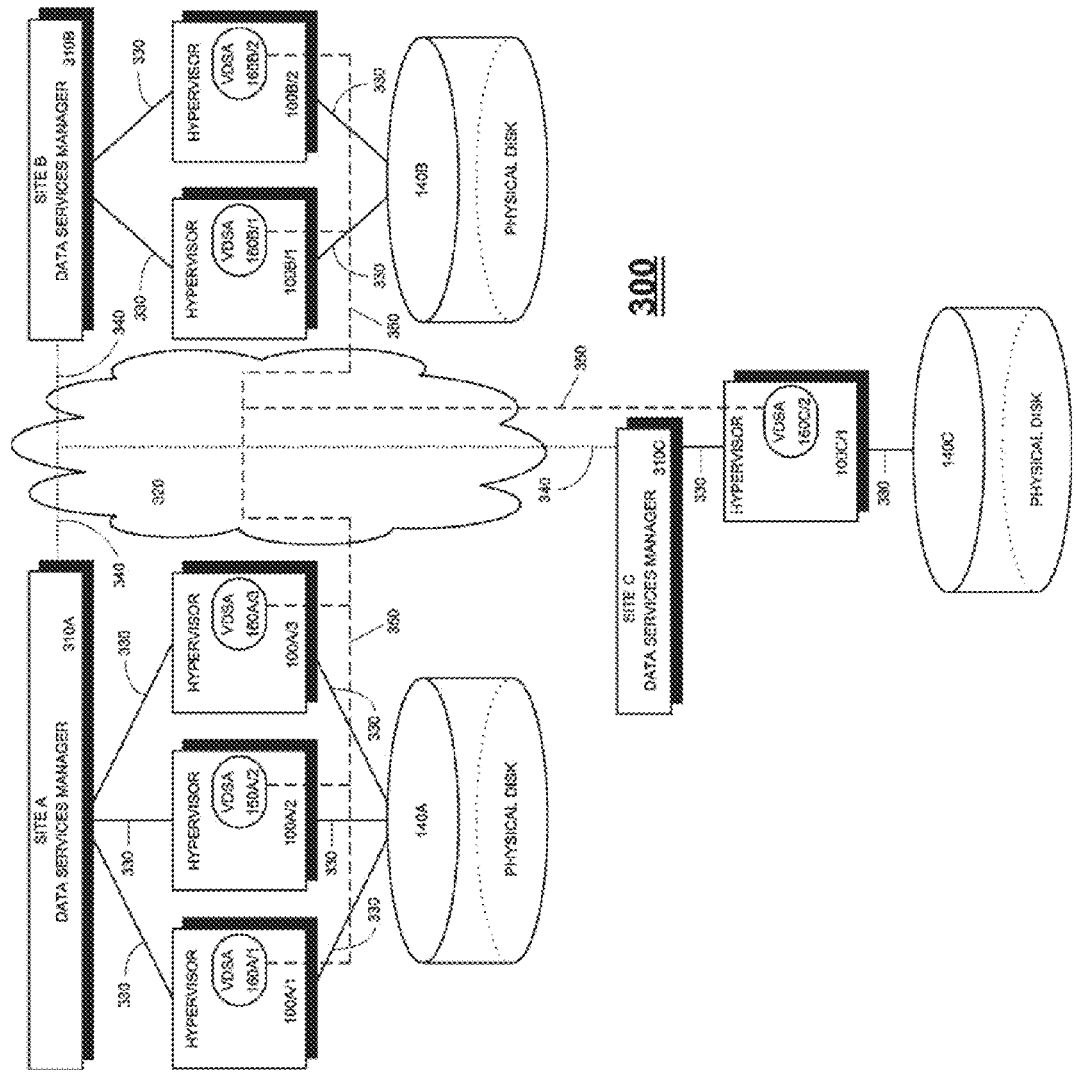
FIG. 4 is a simplified block diagram of a cross-host multiple hypervisor system that includes data services managers for multiple sites that have multiple hypervisors, in accordance with an embodiment of the present invention.

As indicated hereinabove, the architecture of FIG. 1 scales to multiple sites having multiple hypervisors. Reference is made to FIG. 4, which is a simplified block diagram of a cross-host multiple hypervisor system 300 that includes data services managers for multiple sites that have multiple hypervisors, in accordance with an embodiment of the present invention. The architecture of FIG. 4 includes three sites, designated Site A, Site B and Site C, the three sites being communicatively coupled via a network 320. Each site includes one or more hypervisors 100. Specifically, Site A includes three hypervisors, 100A/1, 100A/2 and 100A/3, Site B includes two hypervisors, 100B/1 and 100B/2, and Site C includes one hypervisor 100C/1. The sites have respective one or more physical disks 140A, 140B and 140C.

Figure 7:
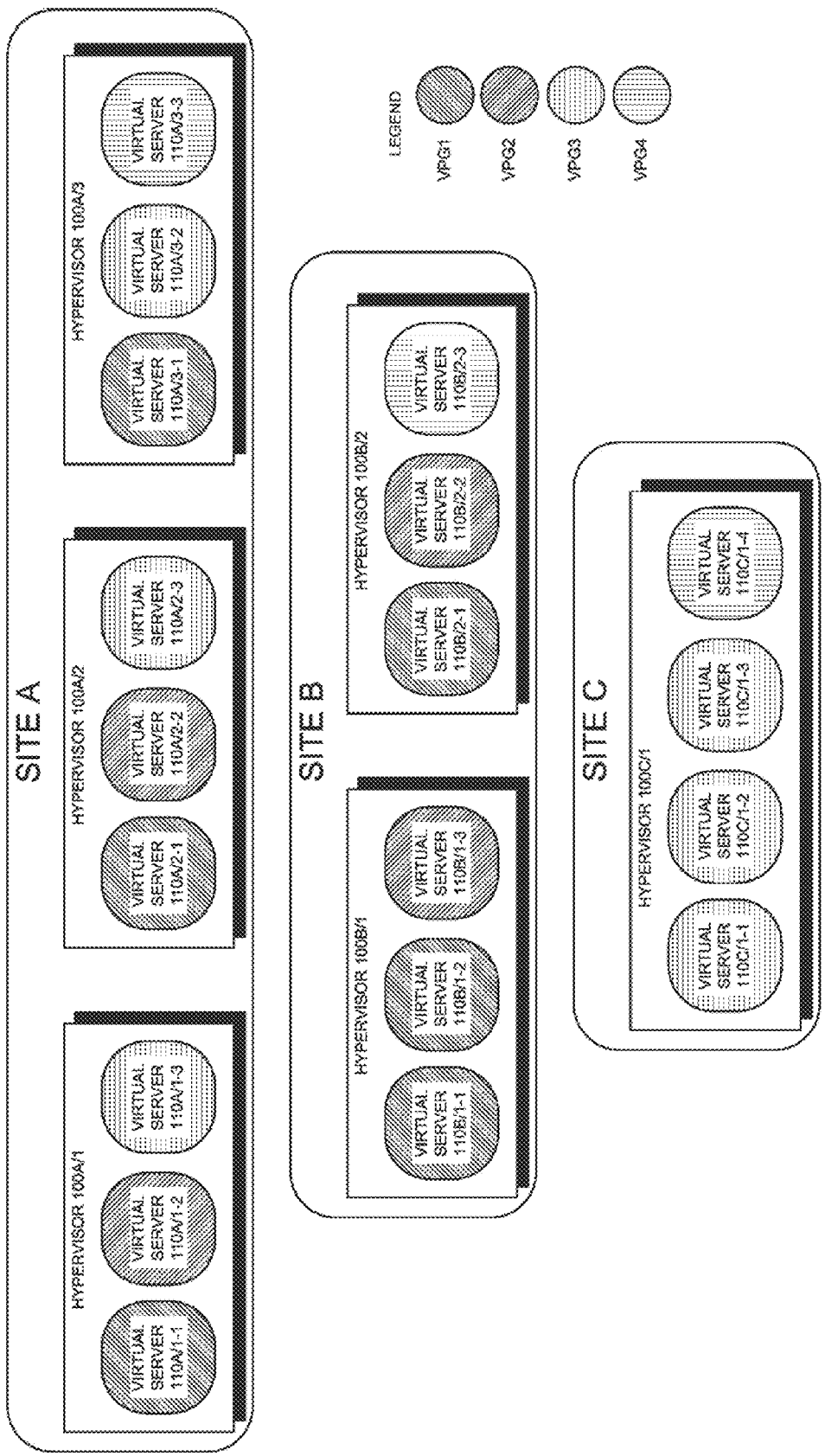
FIG. 7 is an example an environment for the system of FIG. 4, in accordance with an embodiment of the present invention.

The hypervisors are shown in system 300 with their respective VDSA's 160A/1, 160A/2, . . . , and the other components of the hypervisors, such as the virtual servers 110 and virtual disks 120, are not shown for the sake of clarity. An example system with virtual servers 110 is shown in FIG. 7, and described hereinbelow.

The sites include respective data services managers 310A, 310B and 310C that coordinate hypervisors in the sites, and coordinate hypervisors across the sites.

The system of FIG. 4 may be used for data replication, whereby data at one site is replicated at one or more other sites, for protection. The solid communication lines 330 in FIG. 4 are used for in-site traffic, the dashed communication lines 340 are used for replication traffic between sites, and the dotted communication lines 350 are used for control traffic between data services managers.

Data services managers 310A, 310B and 310C are control elements. The data services managers at each site communicate with one another to coordinate state and instructions. The data services managers track the hypervisors in the environment, and track health and status of the VDSAs 160A/1, 160A/2, . . . .

It will be appreciated by those skilled in the art that the environment shown in FIG. 4 may be re-configured by moving one or more virtual servers 110 from one hypervisor 100 to another, by moving one or more virtual disks 120 from one hypervisor 100 to another, and by adding one or more additional virtual servers 110 to a hypervisor 100.

In accordance with an embodiment of the present invention, the data services managers enable designating groups of specific virtual servers 110, referred to as virtual protection groups, to be protected. For virtual protection groups, write order fidelity is maintained. The data services managers enable designating a replication target for each virtual protection group; i.e., one or more sites, and one or more hypervisors in the one or more sites, at which the virtual protection group is replicated. A virtual protection group may have more than one replication target. The number of hypervisors and virtual servers within a virtual protection group and its replication target are not required to be the same.

Figure 5:
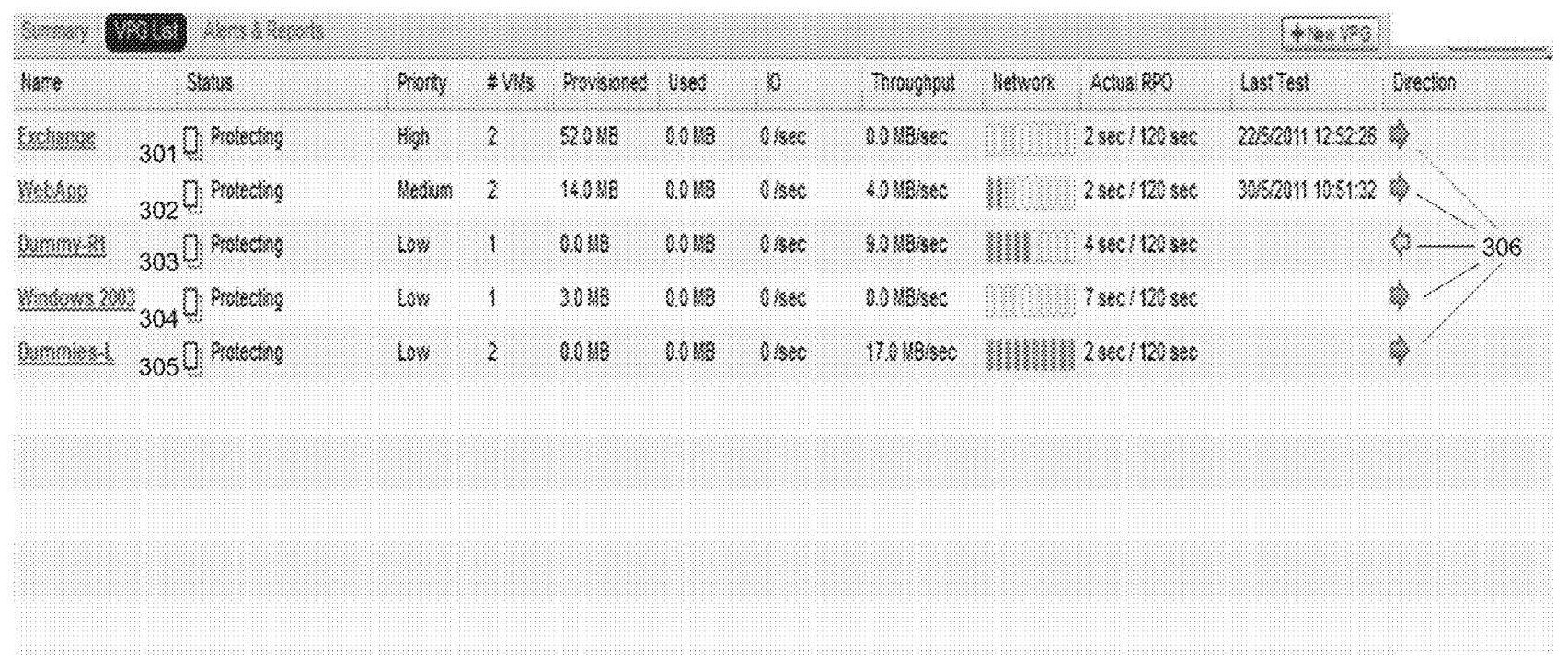

Reference is made to FIG. 5, which is a user interface screenshot of bi-directional replication of virtual protection groups, in accordance with an embodiment of the present invention. Shown in FIG. 4 are virtual protection groups 301 ("Exchange"), 302 ("WebApp"), 303 ("Dummy-R1"), 304 ("Windows 2003") and 305 (Dummies-L"). Arrows 306 indicate direction of replication.

Figure 6:
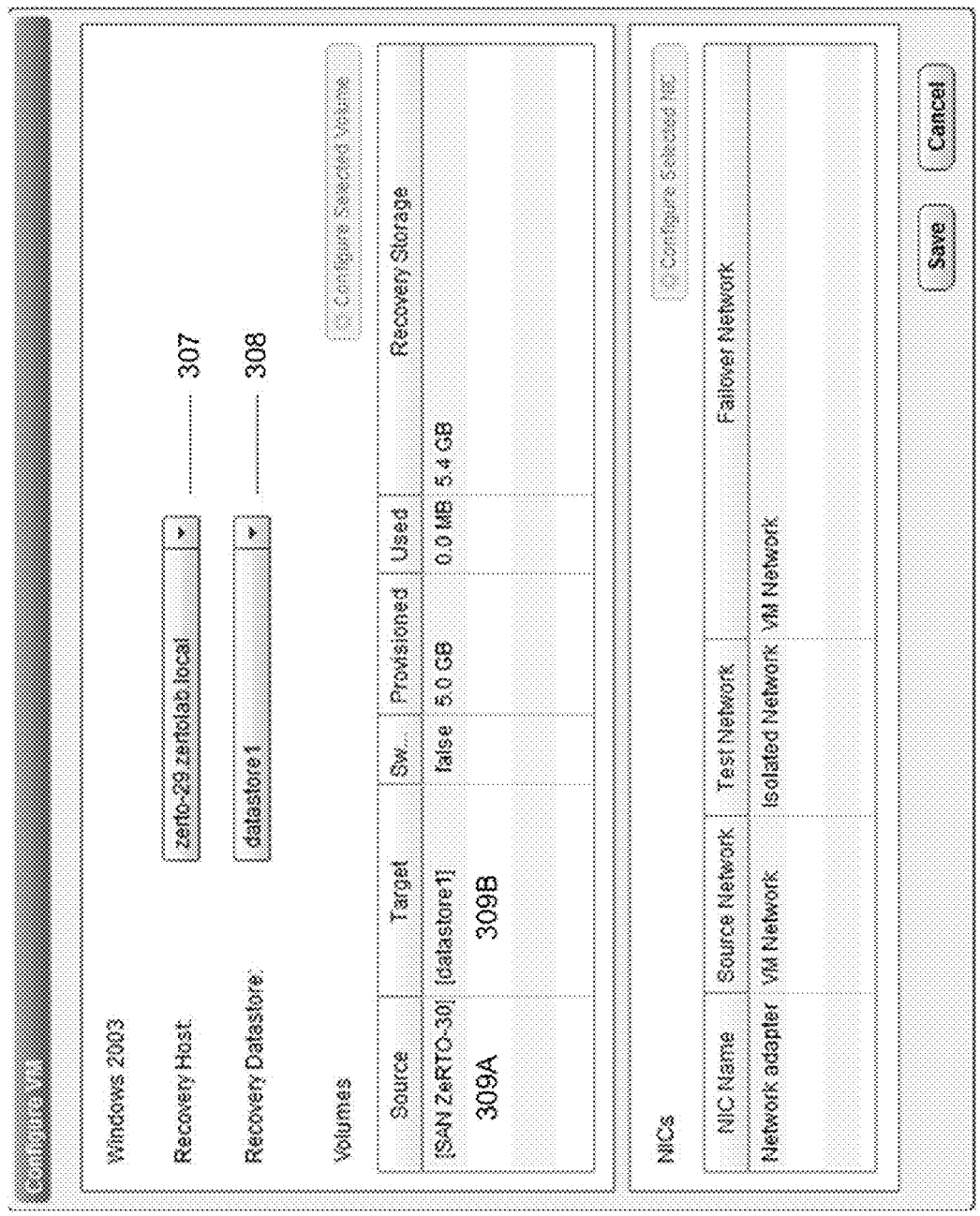
FIG. 6 is a user interface screenshot of assignment of a replication target for a virtual protection group, in accordance with an embodiment of the present invention.

Reference is made to FIG. 6, which is a user interface screenshot of assignment of a replication target for a virtual protection group, in accordance with an embodiment of the present invention. Shown in FIG. 6 is an entry 307 for designating a recovery host, and an entry 308 for designating a recovery datastore for virtual protection group 304 ("Windows 2003") of FIG. 5. Respective source and target datastores, [SAN ZeRTO-30] 309A and [datastore1] 309B, are shown as being paired.

More generally, the recovery host may be assigned to a cluster, instead of to a single hypervisor, and the recovery datastore may be assigned to a pool of resources, instead of to a single datastore. Such assignments are of particular advantage in providing the capability to recover data in an enterprise internal cloud that includes clusters and resource pools, instead of using dedicated resources for recovery.

The data services managers synchronize site topology information. As such, a target site's hypervisors and datastores may be configured from a source site.

Virtual protection groups enable protection of applications that run on multiple virtual servers and disks as a single unit. E.g., an application that runs on virtual servers many require a web server and a database, each of which run on a different virtual server than the virtual server that runs the application. These virtual servers may be bundled together using a virtual protection group.

Referring back to FIG. 4, data services managers 310A, 310B and 310C monitor changes in the environment, and automatically update virtual protection group settings accordingly. Such changes in the environment include inter alia moving a virtual server 110 from one hypervisor 100 to another, moving a virtual disk 120 from one hypervisor 100 to another, and adding a virtual server 110 to a hypervisor 100.

For each virtual server 110 and its target host, each VDSA 160A/1, 160A/2, . . . replicates IOs to its corresponding replication target. The VDSA can replicate all virtual servers to the same hypervisor, or to different hypervisors. Each VDSA maintains write order fidelity for the IOs passing through it, and the data services manager coordinates the writes among the VDSAs.

Since the replication target hypervisor for each virtual server 110 in a virtual protection group may be specified arbitrarily, all virtual servers 110 in the virtual protection group may be replicated at a single hypervisor, or at multiple hypervisors. Moreover, the virtual servers 110 in the source site may migrate across hosts during replication, and the data services manager tracks the migration and accounts for it seamlessly.

Reference is made to FIG. 7, which is an example an environment for system 300, in accordance with an embodiment of the present invention. As shown in FIG. 7, system 300 includes the following components.

Site A

Hypervisor 100A/1: virtual servers 110A/1-1, 110A/1-2, 110A/1-3.

Hypervisor 100A/2: virtual servers 110A/2-1, 110A/2-2, 110A/2-3.

Hypervisor 100A/3: virtual servers 110A/3-1, 110A/3-2, 110A/3-3.

Site B

Hypervisor 100B/1: virtual servers 110B/1-1, 110B/1-2, 110B/1-3.

Hypervisor 100B/2: virtual servers 110B/2-1, 110B/2-2, 110B/2-3.

Site C

Hypervisor 100C/1: virtual servers 110C/1-1, 110C/1-2, 110C/1-3, 110C/1-4.

As further shown in FIG. 7, system 300 includes the following virtual protection groups. Each virtual protection group is shown with a different hatching, for clarity.
VPG1 (shown with upward-sloping hatching)
   Source at Site A: virtual servers 110A/1-1, 110A/2-1, 110A/3-1
   Replication Target at Site B: virtual servers 110B/1-1, 110B/1-2, 110B/2-1
VPG2 (shown with downward-sloping hatching)
   Source at Site B: virtual servers 110B/1-3, 110B/2-2
   Replication Target at Site A: virtual servers 110A/1-2, 110A/2-2
VPG3 (shown with horizontal hatching)
   Source at Site A: virtual server 110A/3-3
   Replication Target at Site B: virtual serer 110B/2-3
   Replication Target at Site C: virtual server 110C/1-4
VPG4 (shown with vertical hatching)
   Source at Site A: virtual servers 110A/1-3, 110A/2-3, 110A/3-2
   Replication Target at Site C: virtual servers 110C/1-1, 110C/1-2, 110C/1-3

As such, it will be appreciated by those skilled in the art that the hypervisor architecture of FIG. 1 scales to multiple host sites, each of which hosts multiple hypervisors. The scaling flexibly allows for different numbers of hypervisors at different sites, and different numbers of virtual services and virtual disks within different hypervisors.

The present invention may be implemented through an application programming interface (API), exposed as web service operations. Reference is made to Appendices I-V, which define an API for virtual replication web services, in accordance with an embodiment of the present invention.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

APPENDIX I

Site Controller Web Services

These web services include methods and properties for pairing and un-pairing sites, and for managing site details.

Properties

- `PeerSiteIdentifier`

This property is a globally unique identifier for the peer site of a given site.

- `SiteConnectionParameters`

This property includes parameters to access a site, including

`string Hostname` – the host name or IP address of the site; and

`int Port` – the port for the virtual data services appliances at the site.

- `SiteIdentifier`

This property is a globally unique identifier for a site.

- `SiteManagementDetails`

This property includes a name, location and contact information for a site, including `string ContactInfo` – the information used to contact an administrator in case recovery is required;

`string Location` – the location of the site; and

`string SiteName` – the name of the site.

- ThisSiteIdentifier

This property indicates the globally unique identifier for the local site.

Methods

- GetPeerConnectionParameters public SiteConnectionParameters Get PeerConnectionParameters()

This method retrieves the IP address and port of the site paired with a given site.

- GetSiteDetails public SiteDetails GetSiteDetails(SiteIdentifier siteIdentifier)

This method retrieves site details, including inter alia the IP address and port of a designated server.

- GetSiteManagementDetails public SiteManagementDetails GetSiteManagementDetails(
    SiteIdentifier siteIdentifier)

This method retrieves the name, location and contact information specified by an administrator for a designated site.

- GetSiteMappings public IEnumerable<SiteMapping> GetSiteMappings()

This method retrieves the identifiers for a site and for its paired site.

- Get TcpPort public int GetTcpPort(SiteIdentifier siteIdentifier)

This method retrieves the TCP port to access the virtual data services application for a designated site.

- GetUsername public string GetUsername()

This method retrieves the username for a hypervisor.

- GetIP public string GetIP()

This method retrieves the IP address or a hostname for a hypervisor.

- IsPaired public bool IsPaired()

This method returns true if the local site is paired with another site. Otherwise, it returns false.

- Pair public void Pair(SiteConnectionParameters peerConnectionParameters)

This method pairs a local site with another site.

- Reconfigure

```
public void Reconfigure(
        String hostname,
        String username,
        String password)
```

This method reconfigures hypervisor information.

- `SetTcpPort`

`public int SetTcpPort(SiteIdentifier siteIdentifier, int port)`

This method sets the TCP port used to access the virtual data services appliances at a designated site.

- `Unpair`

`public void Unpair()`

This method un-pairs a local and remote site.

APPENDIX II

Host Controller Web Services

These web services include methods and properties to identify hypervisors, and to deploy virtual data services appliances on hypervisors.

Properties

- `HostIdentifier`

This property identifies a hypervisor, and includes

`string InternalHostName` – a name used to identify the hypervisor; and

`ServerIdentifier serverIdentifier` – the globally unique identifier for the hypervisor.

Methods

- `GetCurrentlyInstallingHosts`

```
public HostIdentifier GetCurrentlyInstallingHosts(
      SiteIdentifier siteIdentifier)
```

This method retrieves a list of hypervisors where a virtual data services appliance is in the process of being installed, at a designated site.

- `GetCurrentlyRemovingHosts`

```
public HostIdentifier GetCurrentlyRemovingHosts(
      SiteIdentifier siteIdentifier)
```

This method retrieves a list of hypervisors where a virtual data services appliance is in the process of being un-deployed, at a designated site.

- GetInstalledHosts

```
public HostIdentifier GetInstalledHosts(
      SiteIdentifier siteIdentifier)
```

This method retrieves a list of hypervisors where a virtual data services appliance is installed, at a designated site.

- GetUninstalledHosts

```
public HostIdentifier GetUninstalledHosts(
      SiteIdentifier siteIdentifier)
```

This method retrieves a list of hypervisors where a virtual data services appliance is not installed, at a designated site.

- InstallVdsaOnHost

```
public CommandTaskIdentifier InstallVdsaOnHost(
      SiteIdentifier siteIdentifier,
      HostIdentifier hostIdentifier,
      DatastoreIdentifier datastoreIdentifier,
      NetworkIdentifier networkIdentifier,
      VdsaIpConf vdsaIpConf)
```

This method deploys a virtual data services appliance on a specified hypervisor at a designated site, in accordance with a specified datastore, a specified type of network, and access details including inter alia an IP a subnet mask and gateway for the VDSA.

- UninstallVdsaFromHost

```
public void UninstallVdsaFromHost(SiteIdentifier siteIdentifier,
      HostIdentifier hostIdentifier)
```

This method un-deploys a virtual data services appliance from a specified hypervisor, at a designated site.

APPENDIX III

Protection Group Controller Web Services

These web services include methods and properties to manage virtual protection groups.

Properties

- `Checkpoint`

This property identifies a checkpoint by an unsigned integer.

- `FailoverTestInfo`

This property includes information returned from a failover test, including

`DateTime StartTime` – The time the test started, represented as a date and time of day;

`DateTime EndTime` – The time the test ended, represented as a date and time of day;

`TestStatus Status` – A status of the test, including `Unknown, FailedBySystem, AbortedByFailoverCommand, AbortedBySystem, FailedByUser, Success, CurrentlyRunning`;

`string Summary` – a summary of the test;

`string AttachmentName` – a name of an attachment; and

`byte[] Attachment` – a key to an attachment.

- `ProtectionGroupIdentifier`

This property is a globally unique identifier for a virtual protection group.

- `ProtectionGroupManagementSettings`

This property defines settings for a protection group, including

`ProtectionGroupSettings` – properties for a protection group;

`vAppManagementSettings` – properties for a virtual application, when the virtual protection group protects a virtual application; and `VSManagementSettings` – properties for the virtual server.

- `ProtectionGroupSettings`

This property defines settings for a virtual protection group, including

`string Name` – a name used to identify the virtual protection group;

`unsigned int RpoInSeconds` – the maximum number of seconds between checkpoints;

`unsigned long LogVolumeMaxSizeInSectors` – the maximum log size;

`unsigned int LogBacklogInMinutes` – the time during which log entries are kept in cache;

`bool UseCompression` – set to true if data should be compressed when transmitted to the peer site;

`ProtectionGroupDefaults Defaults` – defaults used to identify the recovery site, including the IP address of the hypervisor host, the name of the datastore, and the networks to use for tests and for failovers `ProtectionGroupPriority Priority` – the priority assigned to the virtual protection group; namely, `Low`, `Medium` or `High`;

`int RemoteId` – the identifier assigned to the peer site; and

`int MaxTestIntervalInMinutes` – the maximum time, in minutes, between tests.

- `ProtectionGroupStatus`

This property indicates the status of a virtual protection group, from among `Protecting, NeedReverseConfiguration, Promoting, PromotingAndNeedReverseConfiguration, Test, Failover, PromotionCompleteMirrorsNotYetActivated, MissingConfiguration, PromotingAndMissingConfiguration, RemoveInProgress.`

- `vAppManagementSettings`

This property indicates settings for a virtual application, including

`vAppIdentifier`

`string InternalVAppName` – a name for the virtual application; and

`ServerIdentifier serverIdentifier` – a globally unique identifier for the virtual application; and `vAppSettings`

`string InternalName` – a name of the virtual application replication destination;

`ServerIdentifier serverIdentifier` – a globally unique identifier tor the virtual application replication destination; and `Type` – the type of server hosting the virtual application at the destination; namely, host(0) or cluster(1).

- `VSManagementSettings`

This property indicates settings for a virtual server, including

> `VSIdentifier`
>
>> `string InternalVSName` – a name given to the virtual server; and
>>
>> `ServerIdentifier serverIdentifier` – a globally unique identifier for the virtual server;
>
> `VSSettings`
>
>> `ReplicationDestination` – the destination name, identifier and type (host / cluster) and the datastore name and identifier; and
>>
>> `VSDestinationFolders` – a failover destination folder and a failover test destination folder, including a name and an identifier;
>
> `VNicManagementSettingsCollection` – virtual NIC settings; and
>
> `VolumeManagementSettings` – settings that identify a volume, such as the directory, path and name of the disk and type of disk, such as a raw drive, and whether or not it is a swap disk.

Methods

- `bCheckpointsExist`

```
public bool bCheckpointsExist(
        ProtectionGroupIdentifier identifier)
```

This method returns true if checkpoints exit for a designated virtual protection group.

- ClearSite

```
public CommandTaskIdentifier ClearSite(SiteIdentifier site)
```

This method removes the virtual protection groups defined at a designated site.

- CreateProtectionGroup

```
public CommandTaskIdentifier CreateProtectionGroup(
      ProtectionGroupManagementSettings managementSettings
      SiteIdentifier siteIdentifier)
```

This method creates a virtual protection group at a designated site.

- FailOver

```
public CommandTaskIdentifier FailOver(
      ProtectionGroupIdentifier identifier,
      CheckpointIdentifier checkpoint,
      ProtectionGroupManagementSettings postFailoverSettings)
```

This method performs a failover of the virtual servers in a designated virtual protection group, to a designated checkpoint instance or to the latest checkpoint.

- FailOverTest

```
public CommandTaskIdentifier FailOverTest(
      ProtectionGroupIdentifier identifier,
      CheckpointIdentifier checkpoint)
```

This method performs a failover of the virtual servers in a designated virtual protection group, to a designated checkpoint or to the latest checkpoint, without creating reverse replication and without stopping protection of the virtual servers in the designated virtual protection group.

- ForceRemoveProtectionGroup

```
public CommandTaskIdentifier ForceRemoveProtectionGroup(
      ProtectionGroupIdentifier identifier)
```

This method removes a virtual protection group irrespective of the state of the group. This method is used if the `RemoveProtectionGroup` method is unable to complete successfully.

- ForceUpdateProtectionGroup

```
public CommandTaskIdentifier ForceUpdateProtectionGroup(
      ProtectionGroupIdentifier identifier,
      ProtectionGroupManagementSettings managementSettings)
```

This method updates virtual protection group settings, including removal of virtual servers and disks that should have been removed using the `RemoveProtectionGroup` method. This method is used if the `UpdateProtectionGroup` method is unable to complete successfully.

- GetCheckpointList

```
public List<Checkpoint> GetCheckpointList(
      ProtectionGroupIdentifier identifier)
```

This method retrieves a list of checkpoints for a specified virtual protection group.

- GetFailOverTestInfo

```
public List<FailoverTestInfo> GetFailoverTestInfo(
      ProtectionGroupIdentifier identifier, int numOfTests)
```

This method retrieves information about failover tests for a specified virtual protection group.

- GetProtectionGroupDefaultReverseSettings

```
public ProtectionGroupManagementSettings
GetProtectionGroupDefaultReverseSettings(
     ProtectionGroupIdentifier identifier)
```

This method retrieves the virtual protection group settings for a specified virtual protection group, for use as default values for reverse replication.

- GetProtectionGroupManagementSettings

```
public ProtectionGroupManagementSettings
GetProtectionGroupManagementSettings(
     ProtectionGroupIdentifier identifier)
```

This method retrieves the settings for a designated virtual protection group.

- GetProtectionGroups

```
public IEnumerable<ProtectionGroupIdentifiers> GetProtectionGroups()
```

This method retrieves a list of virtual protection groups.

- GetProtectionGroupState

```
public ProtectionGroupState GetProtectionGroupState(
     ProtectionGroupIdentifier identifier)
```

This method retrieves the state of a specified virtual protection group, the state being "protected" or "recovered". If the group is protected, 0 is returned; and if the group is recovered, 1 is returned.

- GetProtectionGroupStatus

```
public ProtectionGroupStatus GetProtectionGroupStatus(
     ProtectionGroupIdentifier identifier)
```

This method retrieves the status of a specified virtual protection group, the status being inter alia "protecting", "testing" or "promoting".

- InsertTaggedCheckpoint

```
public CommandTaskIdentifier InsertTaggedCheckpoint(
       ProtectionGroupIdentifier identifier, string tag)
```

This method inserts a named checkpoint for a designated virtual protection group. The method returns immediately, without verifying whether or not the checkpoint was successfully written to the journal in the peer site.

- IsPairConnected

```
public bool IsPairConnected()
```

This method returns true if the connection to the paired site is up.

- Move

```
public ComamndTaskIdentifier Move(
       ProtectionGroupIdentifier identifier,
       ProtectionGroupManagementSettings postMoveSettings)
```

This method migrates a specified virtual protection group to the peer site.

- ProtectVS

```
public CommandTaskIdentifier ProtectVS(
       ProtectionGroupIdentifier identifier,
       VSManagementSettings vsManagementSettings)
```

This method adds a designated virtual server to a virtual protection group, in accordance with designated settings.

- RemoveProtectionGroup

```
public CommandTaskIdentifier RemoveProtectionGroup(
      ProtectionGroupIdentifier identifier)
```

This method removes a virtual protection group, unless the group is being replicated during a test failover or an actual failover, and unless the group is being migrated to the peer site. If this method does not return a `Success` completion code, the `ForceRemoveProtectionGroup` method may be used to force removal of the group.

- StopFailOverTest

```
public CommandTaskIdentifier StopFailOverTest(
      ProtectionGroupIdentifier identifier,
      FailoverTestInfo testInfo)
```

This method stops a failover test, and removes the test virtual servers from the peer site.

- TrimOldFailoverTest

```
public void TrimOldFailoverTest(
      ProtectionGroupIdentifier identifier,
      int numOfOldTestsToTrim)
```

This method discards information about a specified number of old failover tests for a designated virtual protection group, from the oldest test to the most recent test.

- UnprotectVS

```
public CommandTaskIdentifier UnprotectVS(
      ProtectionGroupIdentifier identifier,
      VSIdentifier vsIdentifier)
```

This method removes a designated virtual server from a designated virtual protection group.

- UpdateProtectionGroup

```
public CommandTaskIdentifier UpdateProtectionGroup(
      ProtectionGroupIdentifier identifier,
      ProtectionGroupManagementSettings managementSettings)
```

This method updates settings of a specified virtual protection group. If the method does not return a Success completion code, the ForceUpdateProtectionGroup method can be used to force the update.

- WaitForCheckpoint

```
public CommandTaskIdentifier WaitForCheckpoint(
      ProtectionGroupIdentifier identifier,
      Checkpoint checkpoint,
      int waitingIntervalInSeconds,
      int timeoutInSeconds)
```

This method waits for a checkpoint to be written to a journal on the peer site, after it was inserted, or times out if it takes too long.

APPENDIX IV

Command Tracker Web Services

These web services include methods and properties to monitor procedures being executed.

Properties

- `CommandTaskInfoProperties`

This property includes.

`enum CommandType` -- valid methods;

`enum CompletionCode` -- the result of running a method, including `NotAvailable, Success, Aborted, Failed` and `HadException`;

`int OriginalInputParms` -- input parameters; and

`int PgId` -- the globally unique identifier for a virtual protection group.

Methods

- `GetAllTasks`

`public List<CommandTaskIdentifier> GetAllTasks()`

This method retrieves a list of all tasks that are currently active.

- `Get CompletionCode`

```
public CommandTaskCompletionCode GetCompetionCode(
        CommandTaskIdentifier taskid)
```

This method returns the completion code of a specified task. Completion codes include `Success, Aborted, Failed` or `HadException`. If the task is still running, `NotAvailable` is returned.

- `GetCommandTaskInfo`

```
public CommandTaskInfo GetCommandTaskInfo(
     CommandTaskIdentifier cmdIdentifier)
```

This method returns the command type, the completion code input parameters, and the virtual protection group identifier of a designated task.

- `GetExceptionString`

```
public string GetExceptionString(CommandTaskIdentifier taskId)
```

This method returns the string associated with an exception, for a designated task that had an exception. The method `GetCompletionCode` returns `HadException` if a task had an exception.

- `GetProgress`

```
public int GetProgress (CommandTaskIdentifier taskid)
```

This method returns progress as a percentage of a whole task, as an integer, for a specified task.

- `GetProtectionGroupCommandTaskid`

```
public CommandTaskIdentifier GetProtectionGroupCommandTaskId(
     ProtectionGroupIdentifier pgId)
```

This method returns the identifier of a task currently being performed on a designated protection group.

- GetProtectionGroupCommandTaskidLocally

```
public CommandTaskIdentifier
GetProtectionGroupCommandTaskIdLocally(
     ProtectionGroupIdentifier pgId)
```

This method returns the identifier of a task currently being performed on a specified protection group at a local site.

- GetResult

```
public Object GetResult(CommandTaskIdentifier taskId)
```

This commend returns the result for a designated task. The returned result may be one of the following:

the identifier of the virtual protection group identified by the task ID;

the settings of the virtual protection group identified by the task ID;

a checkpoint whose insertion is identified by the task ID; or the identifier of the log collection identified by the task ID.

- GetStatus

```
public CommandTaskStatus GetStatus(CommandTaskIdentifier taskId)
```

This method retrieves the current status of a specified task. The status may be Active, Running, Aborted or Completed.

- Wait

```
public void CommandTaskIdentifier Wait(
        ComamndTaskIdentifier taskId,
        int IntervalInMillis,
        int TimeOutInMillis)
```

This method waits for a specified task to complete, by polling the task at specified time intervals, until a specified time out.

APPENDIX V

Log Collector Web Services

These web services include methods and properties to retrieve information for troubleshooting.

Properties

- `LogCollectionRequest`

This property indicates details of a log request, including a level of detail of information, indicating whether information about a virtual data service appliance and core information should be included, and including start and end times for the information.

Methods

- `CollectSystemLogs`

```
public CommandTaskIdentifier CollectSystemLogs(
        LogCollectionRequest request)
```

This method initiates a log request.

- `RetrieveLogPackage`

```
public Stream RetrieveLogPackage (LogCollectionIdentifier id)
```

This method retrieves results of a log request.

What is claimed is:

1. A cross-host multi-hypervisor system, comprising:
a plurality of host sites executed by at least one processor, each site comprising:
   at least one hypervisor, each of which comprises:
      at least one virtual server;
      at least one virtual disk that is read from and written to by said at least one virtual server;
   a tapping driver installed within a hypervisor kernel of the at least one hypervisor, wherein the tapping driver resides in a software layer between the at least one virtual server and the at least one virtual disk, and the tapping driver in communication with said at least one virtual server, wherein the tapping driver intercepts write requests made by any one of said at least one virtual server to any one of said at least one virtual disk;
   a virtual data services appliance, in communication with said tapping driver, which receives the intercepted write requests from said tapping driver, and which provides data services based thereon; and
   a data services manager for coordinating the virtual data services appliance at the site and for communicatively coupling said plurality of host sites via a network, wherein said data services manager coordinates data transfer across said plurality of host sites via said network;
   wherein said data services manager provides data recovery for the at least one virtual server executing on the at least one hypervisor; and
   wherein the data services manager pairs a source virtual protection group including at least one virtual server at a first host site of the plurality of host sites with a target virtual protection group including at least one server at a second host site of the plurality of host sites.

2. The system of claim 1, wherein at least one virtual data services appliance at a first of said plurality of host sites transmits intercepted write requests to at least one virtual data services appliance at a second of said plurality of host sites, via said network.

3. The system of claim 2, wherein the at least one virtual data services appliance at the second of said plurality of host sites periodically applies the intercepted write requests received from the first of said plurality of host sites to at least one virtual disk at the second of said plurality of host sites.

4. The system of claim 1, wherein said virtual data services appliance at each hypervisor at the first host site of said plurality of host sites preserves write order fidelity for write requests intercepted from virtual servers in the source virtual protection group.

5. The system of claim 4, wherein said virtual data services appliance at each hypervisor at the first host site of said plurality of host sites transmit, via said network, the write requests intercepted from virtual servers in the source virtual protection group, to virtual data services appliances of the second host site of said plurality of host sites that include virtual servers in the target virtual protection group.

6. The system of claim 5, wherein said virtual data services appliances of the second host site of said plurality of host sites that include virtual servers in the target virtual protection group periodically apply the write requests intercepted from the virtual servers in the source virtual protection group to at least one virtual disk at the second host site of said plurality of host sites.

7. The system of claim 1, wherein the at least one virtual server in the source virtual protection group each belong to a same hypervisor.

8. The system of claim 1, wherein the at least one virtual server in the source virtual protection group belong to different hypervisors at a same host site as the first host site of said plurality of host sites.

9. The system of claim 1, wherein the at least one virtual server in the source virtual protection group each belong to hypervisors at different sub-host sites of the first host site of said plurality of host sites.

10. The system of claim 1, wherein the at least one virtual server in the target virtual protection group each belong to a same hypervisor.

11. The system of claim 1, wherein the at least one virtual server in the target virtual protection group each belong to different hypervisors at a same second host site as the second host site of said plurality of host sites.

12. The system of claim 1, wherein the at least one virtual server in the target virtual protection group each belong to hypervisors at different sub-host sites of the second host site of said plurality of host sites.

13. The system of claim 1, wherein the source virtual protection group comprises a same number of virtual servers as the target virtual protection group.

14. The system of claim 1, wherein the source virtual protection group comprises a different number of virtual servers from the target virtual protection group.

15. The system of claim 1, wherein the source virtual protection group spans a same number of hypervisors as does the target virtual protection group.

16. The system of claim 1, wherein the source virtual protection group spans a different number of hypervisors than the target virtual protection group.

17. The system of claim 1, wherein said respective data services managers provide data recovery for the at least one virtual server in the source virtual protection group from the at least one virtual server in the target virtual protection group.

18. The system of claim 17, wherein said respective data services managers provide data recovery for the virtual servers in the target virtual protection group from the virtual servers in the source virtual protection group.

19. The system of claim 1, wherein said data services manager at each site monitors environmental changes, including movement of a virtual server from one hypervisor to another, movement of a virtual disk from one hypervisor to another, and addition of a virtual server to a hypervisor.

* * * * *